(12) United States Patent
Easterbrook

(10) Patent No.: US 6,389,865 B1
(45) Date of Patent: *May 21, 2002

(54) METHOD AND APPARATUS FOR PRODUCING BENEFICIAL STRESSES AROUND APERTURES BY USE OF FOCUSED STRESS WAVES

(75) Inventor: Eric T. Easterbrook, Kent, WA (US)

(73) Assignee: Stresswave, Inc., Kent, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,428

(22) Filed: Mar. 16, 1999

Related U.S. Application Data

(60) Provisional application No. 60/078,356, filed on Mar. 17, 1998.

(51) Int. Cl.[7] .......................... B21D 28/26; B21D 31/00
(52) U.S. Cl. .............................. 72/334; 72/412; 72/377
(58) Field of Search .......................... 72/334, 377, 327, 72/412

(56) References Cited

U.S. PATENT DOCUMENTS

| 2,810,191 A | 10/1957 | Hanna | 29/556 |
| 3,110,086 A | 11/1963 | Phillips | 29/155 |
| 3,434,327 A | 3/1969 | Speakman | 72/377 |

(List continued on next page.)

FOREIGN PATENT DOCUMENTS

| CA | 2121120 | 5/1993 |
| DE | 390726 | 2/1924 |
| JP | 28087 | 3/1977 |
| JP | 2-151321 | 6/1990 |
| JP | 2-274414 | 11/1990 |
| JP | 4-138824 | 5/1992 |
| RU | 1808878 | 4/1993 |
| SU | 439330 | 8/1974 |
| SU | 1648619 | 5/1991 |

OTHER PUBLICATIONS

"The Propagation of Waves in Elastic Solid Media", S.P. Timoshenko and J.N. Goodier, Theory of Elasticity, Third Edition, Chapter 14, pp. 485–504.

"Plastic Waves and Shock Waves", H. Kolsky, Stress Waves in Solids, Chapter VII, pp. 163–182.

"Coining of Holes in Aluminum Plates: Finite Elements Simulations and Experiments", Rutger Ogeman, Journal of Aircraft, vol. 29, No. 5, Sep.–Oct., 1992. pp. 947–952.

"Extending the Fatigue Life of Aircraft Engine Components by Hole Cold Expansion Technology", Antonio C. Ruffin, ASME, presented at International Gas Turbine and Aeroengine Congress and Exposition, Cologne, Germany, Jun. 1–4, 1992. (9 pages).

(List continued on next page.)

Primary Examiner—Daniel C. Crane
(74) Attorney, Agent, or Firm—R. Reams Goodloe, Jr.

(57) ABSTRACT

Tooling and a method of employing tooling to produce beneficial stress waves in a substrate to provide high fatigue life structures. Stress waves are provided to work a substrate, causing dimples in the workpiece, along a uniform pressure profile in the workpiece. By use of the method, uniform beneficial residual stress is provided at surface and midplane apertures in a workpiece, so as to improve overall fatigue life. An improved tool shape is described, having a smooth curve, rather than a flat punch. Also, the use of a consumable wafer provides additional uniform stress profile benefits.

52 Claims, 18 Drawing Sheets

(6 of 18 Drawing Sheet(s) Filed in Color)

U.S. PATENT DOCUMENTS

| | | | |
|---|---|---|---|
| 3,646,791 A | 3/1972 | Leftheris | 72/56 |
| 3,673,833 A | 7/1972 | Cadwell | 72/56 |
| 3,796,086 A | 3/1974 | Phillips | 72/377 |
| 3,803,898 A | 4/1974 | Speakman | 72/416 |
| 3,824,824 A | 7/1974 | Leftheris | 72/56 |
| 3,895,922 A | 7/1975 | Phillips | 29/183 |
| 3,945,109 A | 3/1976 | Leftheris | 29/525 |
| 4,034,585 A | 7/1977 | Straub | 72/53 |
| 4,091,260 A | 5/1978 | Leftheris | 219/149 |
| 4,129,028 A | 12/1978 | Leftheris | 72/430 |
| 4,417,463 A | 11/1983 | Nelson | 72/430 |
| 4,423,619 A | 1/1984 | Champoux | 72/393 |
| 4,493,141 A | 1/1985 | Krezak | 29/509 |
| 4,711,115 A | 12/1987 | Sukonnik | 72/329 |
| 4,862,043 A | 8/1989 | Zieve | 318/114 |
| 4,885,829 A | 12/1989 | Landy | 29/156.8 |
| 4,934,170 A | 6/1990 | Easterbrook et al. | 72/370 |
| 5,398,537 A | 3/1995 | Michalewski et al. | 72/430 |
| 5,771,729 A | 6/1998 | Bailey et al. | 72/53 |

OTHER PUBLICATIONS

"Fatigue Improvement by Sleeve Coldworking", Joseph L. Phillips, SAE, Inc., National Aerospace Engineering and Manufacturing Meeting, Los Angeles, California, Oct. 16–18, 1973. (13 pages).

"The Latest Technology in Hole Finishing: Ballizing", Sid Grodsky, Final Finish Technology, Spring, 1988, pp. 10–18.

"A Comparison of Two Manufacturers' Coldwork Tooling Systems: Does a Hole Recognize a Manufacturers' Part Number?", G. Rodman and M. Creager, West Coast Industries, (12 pages).

"Shear Crack Issues Addressed by Split Mandrel and Automated Coldworking", Matthew Weigel, Anthony Leon, SAE Aerofast 1996 Conference, Bellevue Washington, Oct. 1–3, 1996 (9 pages).

"Improvement of Fatigue Performance By Cold Hole Expansion. Part 1: Model of Fatigue Limit Improvement", V. Kliman, M. Bily and J. Prohacka, International Journal Fatigue, Mar. 1993, pp. 93–100.

"Improvement of Fatigue Performance By Cold Hole Expansion. Part 2: Experimental Verification of Proposed Model", V. Kliman, M. Bily and J. Prohacka, International Journal Fatigue, Mar. 1993, pp. 101–105.

"Automated Applications for the Split Mandrel Coldworking System", West Coast Industries, Fatigue Tech–Notes, Split Mandrel Automation 1093, (5 pages).

"The Effect of Interference on the Dimpled, Loaded–Hole Fatigue Strength of 2024–T3 Alcad® Aluminum Alloy", A.P. Kuc and J. Shewchuk, Journal of Testing and Evaluation, JTEVA, vol. 6, No. 3, May, 1978, pp. 157–166.

"Stress Corrosion Susceptibility of Stress–Coined Fastener Holes in Aircraft Structures", A.E. Carter and S. Hanagud, AIAA Journal, vol. 13, No. 7, pp. 858–863.

"Incorporating Hole Cold Expansion to Meet Durability and Damage Tolerance Airworthiness Objectives", L. Reid, Fatigue Technology Inc., #972624, (9 pages).

"Analysis of Stress and Deformation" Introduction to Contact Mechanics, Elastic Identation Stress Fields, Chapter 5, pp. 116–117.

--- UNIFORM PRESSURE
— — SPHERICAL INDENTER
——— FLAT CYLINDRICAL INDENTER

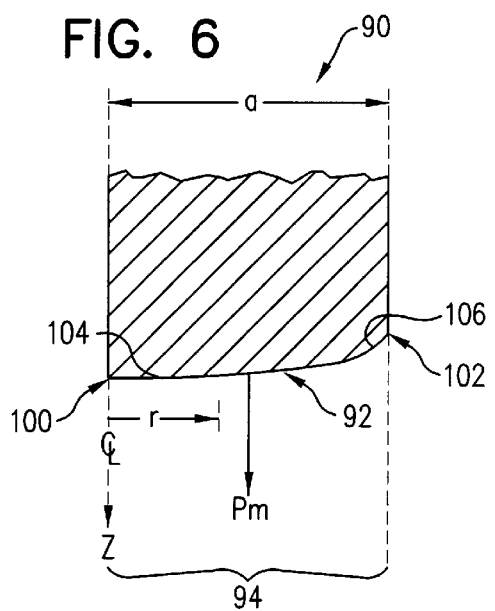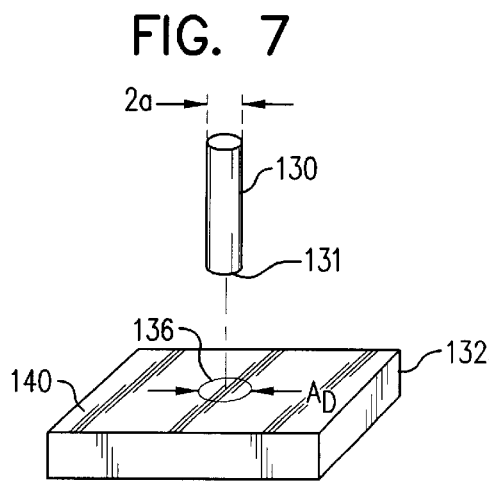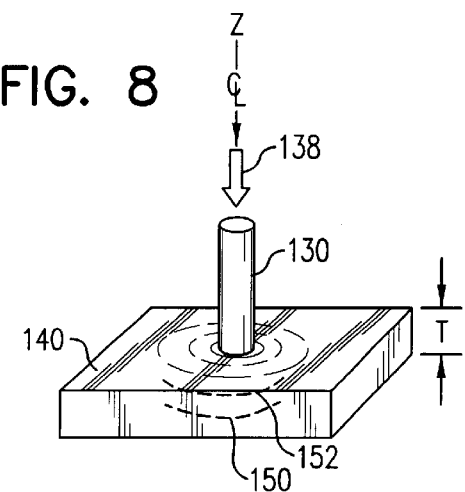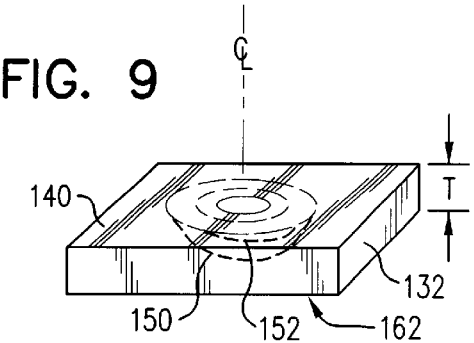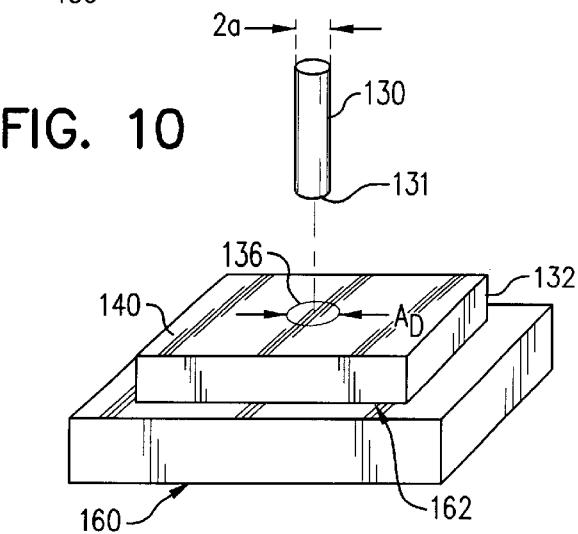

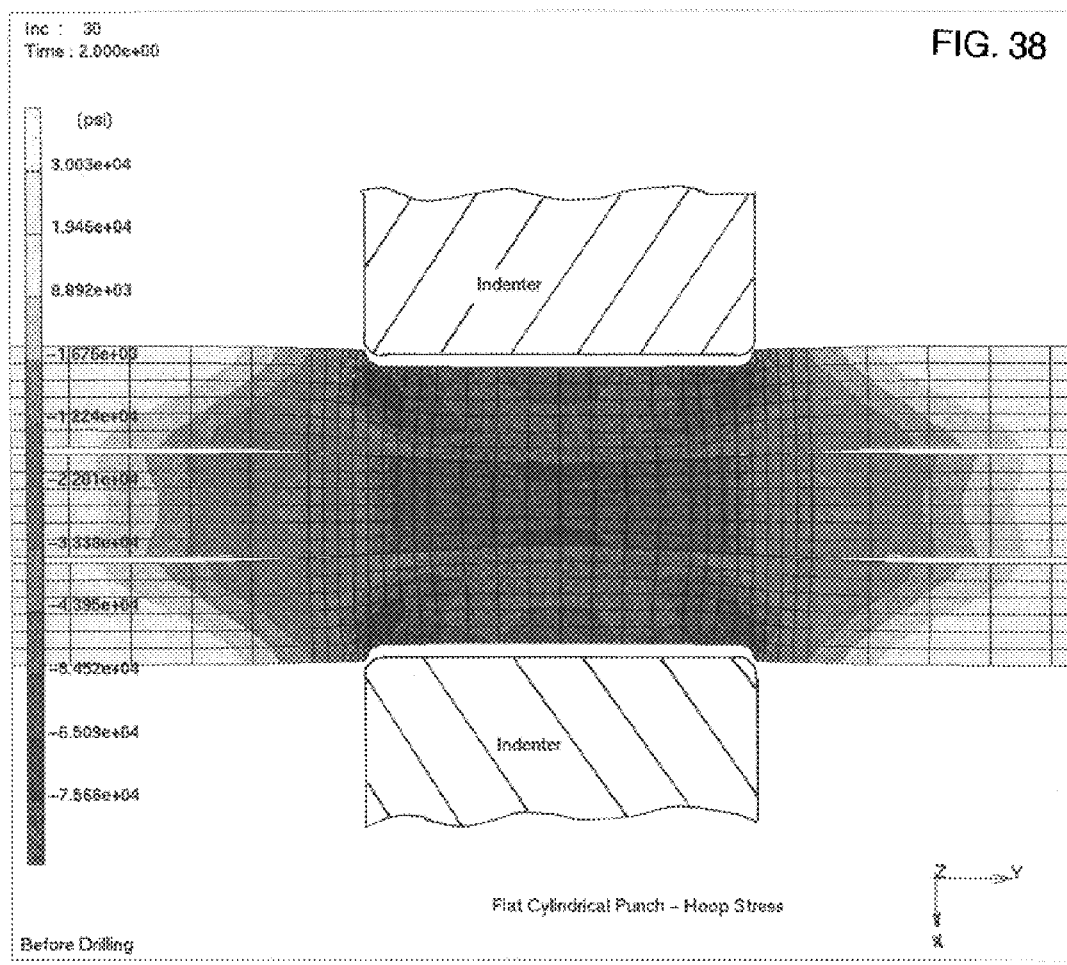

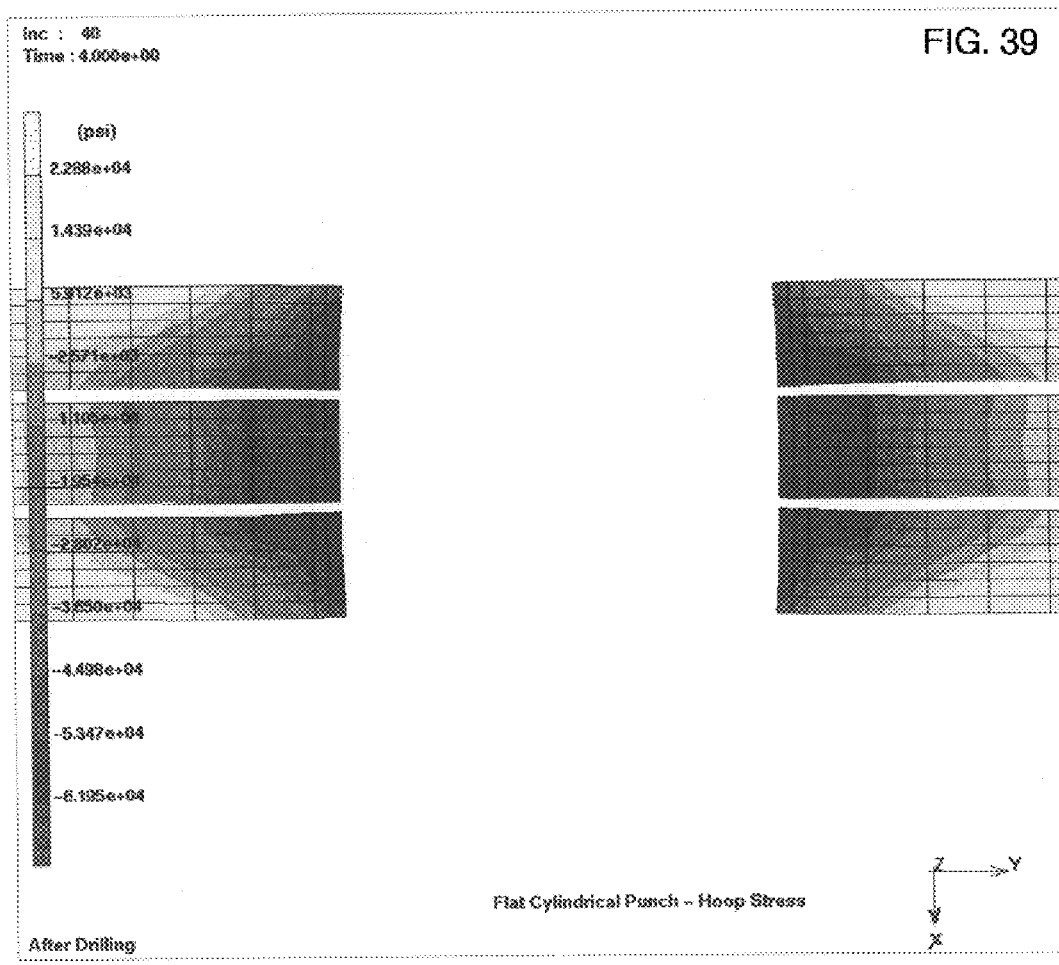

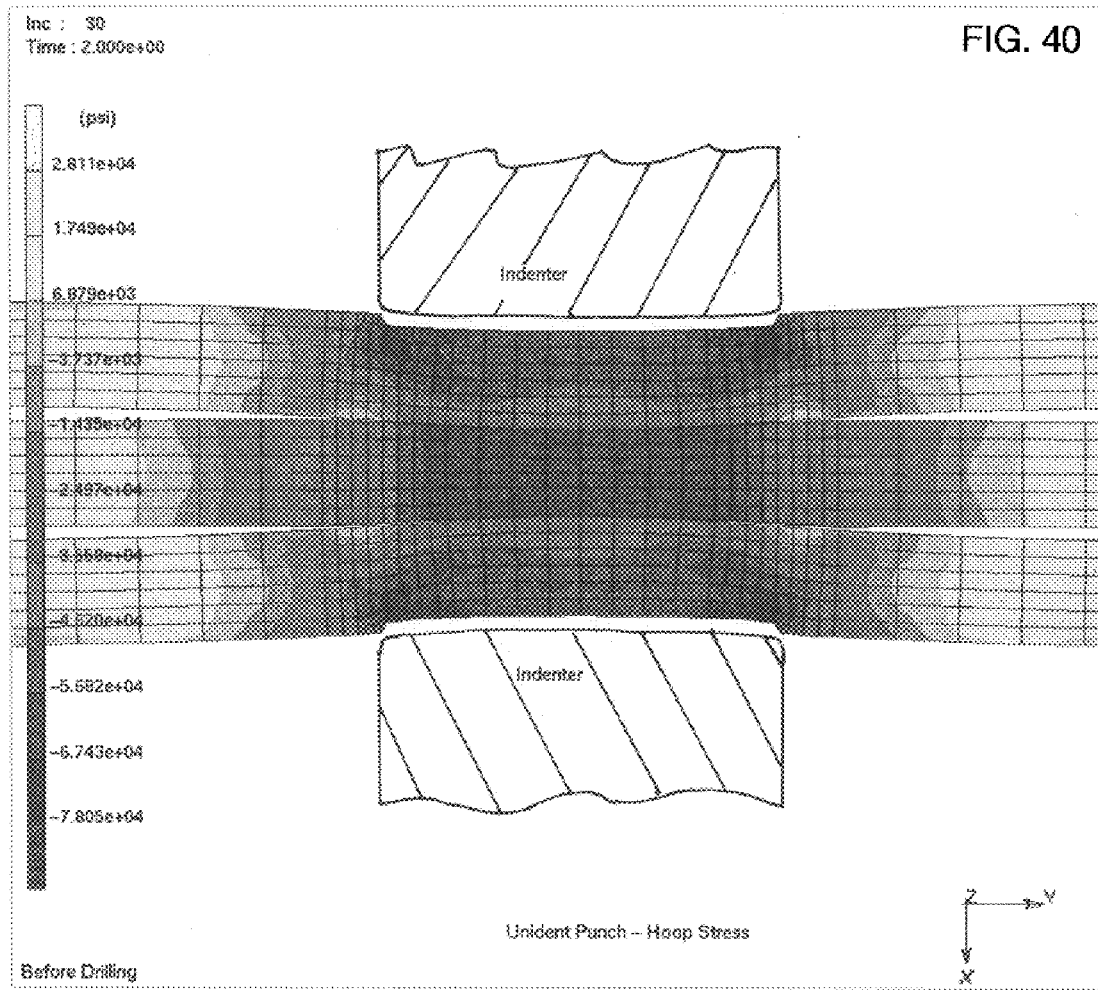

RESIDUAL STRESS COMPARISON, SURFACE AND MID-PLANE MODIFIED CYLINDRICAL MANDREL

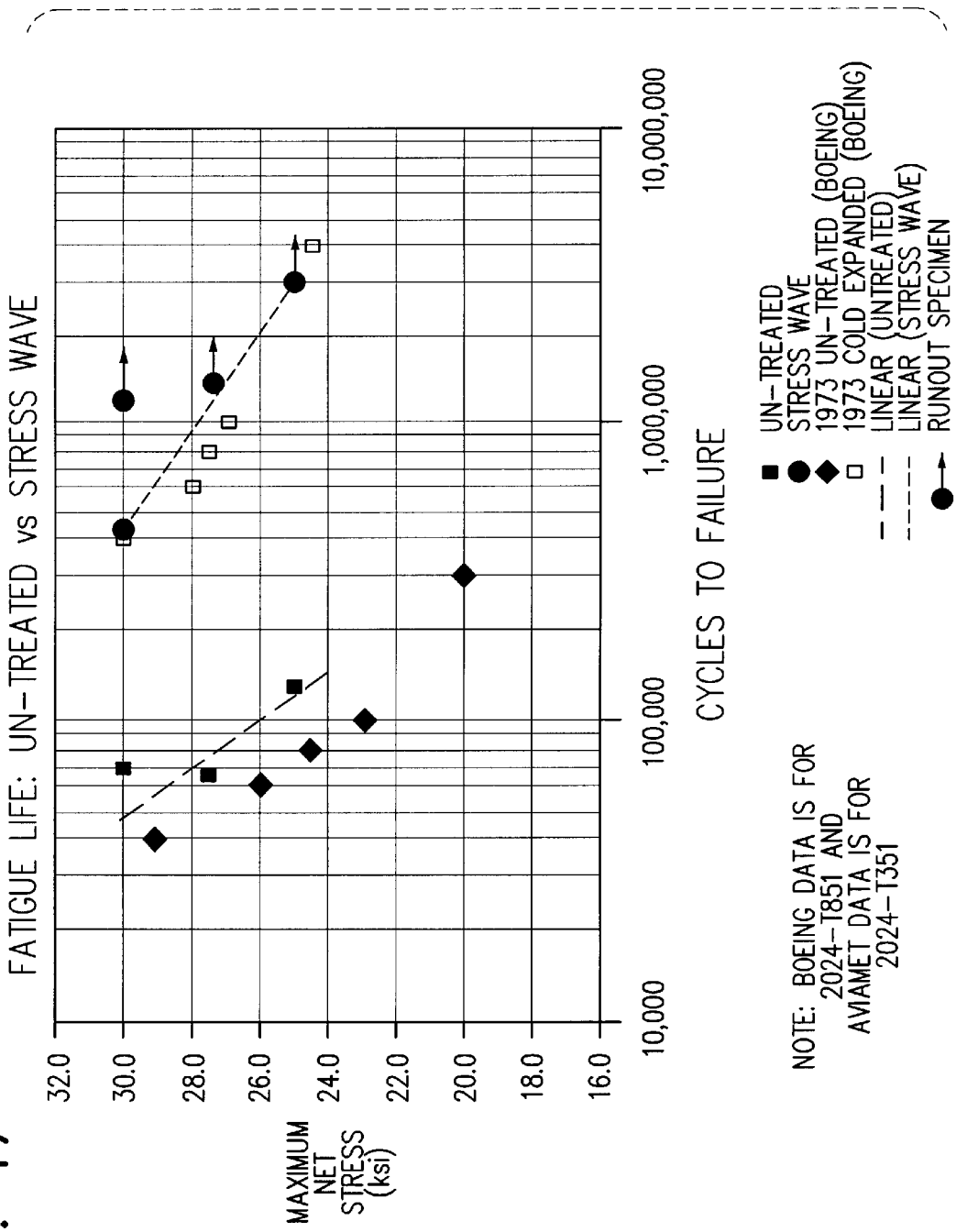

METHOD AND APPARATUS FOR PRODUCING BENEFICIAL STRESSES AROUND APERTURES BY USE OF FOCUSED STRESS WAVES

This application claims benefit of provisional application Ser. No. 60/078,356, filed Mar. 17, 1998.

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention is related to novel methods and tools for use in manufacturing parts with improved fatigue life, particularly for parts having fastener apertures therein, or cutouts therein, and which parts are subject to repeated or prolonged stress. More specifically, this invention relates to improved techniques for utilizing the stress wave method for working parts, to improved tools for utilizing the stress wave method for working parts, and to finished parts made thereby, which parts have improved stress fatigue resistance characteristics.

BACKGROUND

Metal fatigue is a problem common to just about everything that experiences cyclic stresses. Such problems are especially important in transportation equipment, such as aircraft, ships, trains, cars, and the like. Metal fatigue can be defined as the progressive damage, usually evidenced in the form of cracks, that occurs to structures as a result of cyclic loading. This failure mode is not to be confused with a failure due to overload. The lower surface of an aircraft wing is a classical example of the type of loading that produces fatigue. The wing is subjected to various cyclic stresses resulting from gust, maneuver, taxi and take-off loads, which over the lifetime of a particular part eventually produces fatigue damage. Similarly, the pressurized envelope of an aircraft, including the fuselage skin and rear pressure bulkhead, are subject to a stress cycle on each flight where the aircraft interior is pressurized.

One problem inherent in fatigue damage is that it can be hidden since it generally occurs under loads that do not result in yielding of the structure. Fatigue damage is most often observed as the initiation and growth of small cracks from areas of highly concentrated stress. Undetected, a crack can grow until it reaches a critical size. At that point, the individual structural member can suddenly fail. Catastrophic failure of an entire structure can also occur when other members of the adjacent portions of the overall structure can not carry the additional load that is not being carried by the failed structural member.

Even stationary objects, such as railroad track or pressure vessels, may fail in fatigue because of cyclic stresses. Cyclic loads for railroad track are caused by repeated loading from the wheels running over an unsupported span of track. In fact, some of the earliest examples of fatigue failures were in the railroad industry and in the bridge building industry. Sudden pressure vessel failures can be caused by fatigue damage that has resulted from repeated pressurization cycles. Importantly, government studies report that fatigue damage is a significant economic factor in the U.S. economy.

Fatigue can be defined as the progressive damage, generally in the form of cracks, that occur in structures due to cyclic loads. Cracks typically occur at apertures (holes), fillets, radii and other changes in structural cross-section, as at such points, stress is concentrated. Additionally, such points often are found to contain small defects from which cracks initiate. Moreover, the simple fact that the discontinuity in a structural member such as a fuselage or wing skin from a hole or cutout forces the load to be carried around the periphery of such hole or cutout. Because of this phenomenon, it is typically found that stress levels in the structure adjacent to fastener holes or cutouts experience stress levels at least three times greater than the nominal stress which would be experienced at such location, absent the hole or cutout.

It is generally recognized in the art that the fatigue life in a structure at the location of a through aperture or cutout can be significantly improved by imparting beneficial residual stresses around such aperture or cutout. Various methods have been heretofore employed to impart beneficial residual stress at such holes or cutouts. Previously known or used methods include roller burnishing, ballizing, and split sleeve cold expansion, split mandrel cold working, shot peening, and pad coining. Generally, the compressive stresses imparted by the just mentioned processes improve fatigue life by reducing the maximum stresses of the applied cyclic loads at the edge of the hole. Collectively, these processes have been generically referred to as cold working. The term cold working is associated with metal forming processes where the process temperature is lower than the recrystallization temperature of the metal. A similar term, "cold expansion", as used by Fatigue Technology Inc., of Tukwila, Wash., is often used interchangeably with cold working, but as applied specifically to their split sleeve cold expansion process. However, of all the methods used to cold work holes, presently the most widely used processes are the split sleeve process and split mandrel process. Together, these processes are referred to as mandrel cold working processes.

Historically, mandrel cold working was accomplished through strictly manual means. As an example, split sleeve cold expansion of holes is still done using hand-held hydraulic tools attached to air-actuated hydraulic power units. The variables involved in tool selection, implementation, and control of the cold expansion process requires skilled operators to reliably produce properly treated holes. Unfortunately, the requirement of having a skilled operator to perform the task is a disadvantage in that it continuously presents the risk of improper or inaccurate processing. Also, such labor-intensive techniques effectively preclude automated feedback necessary for statistical process control. Although development of that process continues, the complexity of the split sleeve processes and the apparatus utilized presently precludes the widespread adoption of the process for automated fastening environments. The split mandrel process it at a similar stage of development; manually performed, but with some minor automation.

The mandrel cold working processes have a particular disadvantage in that they require precision in the size of the starting holes, usually in the range of from about 0.002 inch to about 0.003 inch in diametric tolerance, in order to achieve uniform expansion. Also, an undersize starting hole is required in that process, in order to account for the permanent expansion of the hole and the subsequent final ream that is necessary to remove both the localized surface upset around the periphery of the hole, as well as the axial ridge(s) left behind by the edges of the sleeve split or mandrel splits at their working location within the aperture, and of course, to size the holes. Moreover, treatment requires the use of two reamers; one that is undersized, for the starting hole diameter, and one which is provided at the larger, final hole diameter.

Another undesirable limitation of mandrel cold working processes is the requirement for, presence of, and residual effect of lubricants. For the split sleeve cold expansion process the starting hole must be free of residual lubricants (used for drilling) to prevent sleeve collapse during processing. A collapsed sleeve can be very difficult to remove and necessitates increasing the hole diameter beyond the nominal size, to remove the subsequent damage. The split mandrel process uses a liquid cetyl alcohol lubricant that must be cleaned from the hole after cold working, in order to ensure proper paint adhesion. In either case, the cold worked hole must be cleaned with solvents, in order to remove lubricants. Such chemical solvents are costly, require additional man-hours for handling and disposal, and if not effectively controlled during use or disposal, can have a deleterious effect on operators and/or the environment.

Still another limitation of the prior art mandrel cold working processes is their effect on the surface of the aperture being treated, i.e. the metal wall which defines the hole. The "split" in the split sleeve or the multiple splits in a split mandrel can cause troublesome shear tears in type 7050 aluminum, and in some other alloys. Shear tears, which are small cracks in the structural material near the split(s), are caused by the relative movement of the material near the split. Significantly, the increasing use of type 7050 aluminum in aircraft structures has created a large increase in the number of shear tears reported. Although such tears are generally dismissed as cosmetic flaws, they nevertheless produce false positives in non-destructive inspections for cracks.

Also, in the mandrel cold working processes, the sliding action of a mandrel produces a large amount of surface upsetting around the periphery of the hole, especially on the side of the structure where the mandrel exits the hole. In the split mandrel process, this effect is clearly seen, because of the direct contact of the mandrel with the aperture sidewall. The undesirable surface upset can increase the susceptibility to fretting, which may lead to a reduction in life for fastened joints. Additionally, surface upset in a stackup of structural layers can cause disruption of the sealant in the faying surface. To some extent the undesirable surface upset can be reamed out when sizing the final hole diameter, but at least some portion (and normally a substantial portion) remains.

Pad coining is another process that has been used to improve the fatigue life of holes and other cutouts. This process is described in U.S. Pat. No. 3,796,086 issued Mar. 12, 1974 to Phillips for Ring Pad Stress Coining, and the related, commonly owned U.S. Pat. No. 3,434,327, issued Apr. 16, 1974 to Speakman for Ring Pad Stress Coining Tooling. This method uses opposing dies to cold work an existing hole or aperture. The pad coin process leaves a characteristic concentric impression around the periphery of the cutout. The reduced thickness impression is a major drawback of the process, since the reduced section thickness reduces the bearing area of the hole. Further, the impression makes attaching thin structure at treated fastener holes problematic, since a panel may buckle when the fastener is tightened. Moreover, the process does not attempt to perform ring pad stress coining on a structure prior to machining the hole.

As described in U.S. Pat. No. 3,824,824 issued to Leftheris on Jul. 23, 1974, and entitled Method and Apparatus for Deforming Metal, the stress wave phenomenon has previously been used to deform a metal workpiece by passing stress waves through the workpiece to momentarily render the metal plastic. Such methods and related devices have been employed for metal forming, riveting and spot welding operations.

Another invention by Leftheris, U.S. Pat. No. 4,129,028 issued on Dec. 12, 1978 for a Method and Apparatus for Working a Hole, couples mandrel cold working to the aforementioned stress wave process. The object of this latter mentioned invention was to simultaneously cold work and control the finish and dimensional characteristics of a hole. The process treats both straight and tapered starting holes by driving tapered mandrels through or into an existing hole, using a stress wave generator. The invention teaches production of close tolerance holes to a surface finish of 30 micro-inch RMS. However, as with the other mandrel cold working methods, this process requires a close tolerance starting hole, and is subject to the same surface upset problem as the other mandrel cold working methods. Thus, while this variation of Leftheris's work realized that it would be advantageous to utilize stress waves to impart residual stresses in structures in an amount sufficient to provide improved fatigue life, the process still suffers from the same starting hole methodology that is used with the mandrel cold working processes.

Another attempt to provide a method for cold working holes was developed by Wong and Rajic, as taught in WIPO International Publication Number WO 93/09890, published May 27, 1993, entitled Improving Fatigue Life of Holes. The method was an improvement over the pad coining methods, because the impression made in the structure being treated is smaller than the hole diameter, thus eliminating the undesirable concentric ring provided in coining methods. Also, although such teaching was advantageous in that it eliminated the need for preparing the starting hole that is required with the mandrel and coining processes, a significant drawback to the Wong process was that it required relatively high loads to indent or cold work the structure being treated. This can be understood from considering minimum quasi-static mandrel load necessary to initially indent a sheet. The initial mean contact pressure, $P_M$, for initial yield (indentation) is estimated by the following equation:

$$P_M = 1.10 \times (\text{compressive yield stress})$$

The load P for initial yielding or indenting is calculated by multiplying $P_M$, by the cross sectional area of the mandrel. Therefore:

Mandrel Load (P)=1.10 (compressive yield stress) (mandrel cross sectional area) In practicality, the load necessary to impart fatigue improvement is far greater. For example, the 0.063 inch (1.6 mm) thick 2024-T3 aluminum specimens used in the Wong/Rajic disclosure were cold worked with a (0.158 inch diameter) 4.0 mm diameter cylindrical mandrel. The initial mandrel indentation load using these parameters is calculated at 835 pounds (3714 Newtons). Because the indentation process must go well beyond the initial indentation load to achieve fatigue life improvement, the force used in the Wong/Rajic test ranged from 3595 pounds (15991 N) to 4045 pounds (17994 N) for the (0.158 in.) 4.0 mm diameter mandrel. As a comparison, the forces necessary to cold work (indent) a common ¼ inch (6.35 mm) diameter fastener can be as high as 10,000 pounds (44484 N). Unfortunately, loads of such magnitude generally require large and bulky machinery such as power presses, hydraulic presses, drop hammers, etc., and as a result, their use is precluded from widespread use in automated fastening systems.

The impracticality of such just mentioned heavy, large equipment for automated fastening are identified by Zieve in U.S. Pat. No. 4,862,043. Commenting on the prior art apparatus, Zieve states, " . . . a C-yoke squeezer is a large, expensive device which extends around the workpiece to provide an integral backing member. However, such devices are impractical for many applications, since the throat depth requirements, i.e., the distance of the rivet from the edge of the workpiece, result in an apparatus which is impractically large and expensive because of the corresponding stiffness demanded for the required throat depth." It is clear that the Wong/Rajic invention dos not teach the propagation of stress waves into the metal for deformation and subsequent residual stress development. Therefore, they do not anticipate the use of stress wave technology to significantly lower the strength and size requirements of the processing device or its supporting structure.

The mandrels in the Wong/Rajic disclosure are designed for the purposes of both indenting and hole punching. While their invention allows for mandrel end shapes to be flat or conical, they do not use the shape of the mandrel end to optimize the extent of the residual stresses. A large and uniform zone of residual stresses is required to produce the highest fatigue life. A mandrel that has a flat end is well suited for forming or punching the hole, but induces a low amount of residual stress at the surface of the sheet. On the other hand, mandrels that have a conical end increase surface residual stresses but tend to "plow" the material radially and produce substantial surface upsetting. It is clear then that the prior art, in regards to the configuration of the mandrel ends, does not optimize the extent and depth of the residual stresses.

The Wong/Rajic process can also be used to treat non-circular cutouts using either of two methods. The first method uses a solid mandrel with the same cross sectional shape of the hole. The second method treats selected areas of the cutout using solid circular mandrels prior to machining the cutout. The second method is similar to the invention of Landy, U.S. Pat. No. 4,885,829 which uses the split sleeve cold expansion process to treat selected radii of the cutout. After machining the cutout sufficient residual stresses remain in the radii to improve fatigue life. Another invention by Easterbrook and Landy, U.S. Pat. No. 4,934,170, treats existing non-circular holes and cutouts using tools that conform to the shape of the hole. A common weakness of each of these methods are that only selected areas (radii) of the cutout are cold expanded. The non-uniformity of the residual stresses caused by treating only the radii of the cutout allows for tensile stresses to be present at the hole edge. This has the potential to reduce fatigue life.

The aforementioned invention by Zieve, and others similar to it, are used to drive rivets and fasteners using electromagnetic drivers. Such techniques and apparatuses, however, are not used for cold working a metal structure prior to machining the hole. Hence, in summary, present methods of cold working holes and other cutouts using tapered mandrel methods, coining, punching, and such are not adaptable to automated fastening systems and other automated environments because of their complexity and bulkiness of equipment. Also, presently known methods used by others do not treat the entire periphery of non-circular cutouts leading to potential fatigue life degradation. Finally, prior art countersink cold working methods require re-machining of the formed countersink to achieve the desired fastener flushness.

Thus, the following items summarize the shortcomings of the current methods and will be used as a basis for comparing with my novel, improved stress wave fabrication method. Heretofore known processes are not entirely satisfactory because:

They often require mandrels, split or solid, and disposable split sleeves, which demand precision dimensions, which make them costly;

Mandrels and sleeves are an inventory and handling item that increases actual manufacturing costs when they are employed;

"Mandrel" methods require a different mandrel for roughly each 0.003 to 0.005 inch change in hole diameter, since each sleeve is matched to a particular mandrel diameter, and consequently, the mandrel system does not have the flexibility to do a wide range of hole existing hole diameters;

Each hole diameter processed with "mandrel" methods requires two sets of reamers to finish the hole, one for the starting dimension and another for the final dimension;

Mandrel methods rely on tooling and hole dimensions to control the amount of residual stress in the part, and therefore the applied expansion can be varied only with a change of tooling;

Mandrel methods require some sort of lubricant; such lubricants, and especially the liquids, require solvent clean up;

Splits in a sleeve or splits in a mandrel can cause troublesome shear tears in certain 7000 series aluminum alloys;

The pulling action against mandrels, coupled with the aperture expansion achieved in the process, produces large surface marring and upsets around the periphery of the aperture;

Split sleeve methods are not easily adapted to the requirements of automation, since the cycle time is rather long when compared with the currently employed automated riveting equipment;

Mandrel methods are generally too expensive to be applied to many critical structures such as to aircraft fuselage joints, and to large non-circular cutouts;

Mandrel methods have limited quality control/quality assurance process control, as usually inspections are limited to physical measurements by a trained operator.

OBJECTS, ADVANTAGES, AND NOVEL FEATURES

My novel stress wave manufacturing process can be advantageously applied to apertures for fasteners, to large holes, to non-round cutouts from a workpiece, and to other structural configurations. Treating a workpiece structure for fatigue life improvement, prior to fabricating the aperture itself, has significant technical and cost advantages. The method is simple, easily applied to robotic manufacturing methods, and is otherwise superior to those manufacturing methods heretofore used or proposed.

From the foregoing, it will be apparent to the reader that one important and primary object of the present invention resides in the use of a novel method for treating a workpiece to reduce fatigue stress degradation of the part while in service, and to novel tool shapes for achieving such results. The method and novel tools simplify the manufacturing costs, and importantly, simplifies and improves quality control in the manufacture of parts having an improved fatigue life.

Other important but more specific objects of the invention reside in the provision of an improved manufacturing process for enhanced service life metal parts subject to fatigue stress, as described herein, which:

eliminates the requirement for purchase, storage, and maintenance of mandrels;

eliminates the requirement for purchase, storage, and maintenance of split sleeves;

eliminates the need for disposal of split sleeves;

eliminates the need for lubrication and subsequent cleanup during manufacture of structures containing apertures therethrough;

enables the manufacture, of a wide range of aperture diameters, in which appropriate fastener diameters can be employed;

allows the magnitude and depth of the residual stresses to be carefully controlled, by way of the amount of energy input into the stress wave;

enables process control to be established using stastical feedback into the manufacturing system, thus enhancing quality assurance;

eliminates shear tears in a workpiece that are commonly encountered in mandrel manufacturing methods;

significantly reduces or effectively eliminates surface marring and upset associated with mandrel methods, thus significantly increasing fatigue life;

is readily adaptable to automated manufacturing equipment, since manufacturing cycle times are roughly equivalent to, or less than, cycle times for automated riveting operations;

eliminates bulky hydraulic manufacturing equipment typically used in mandrel methods, and substitutes simple preferably electromagnetic equipment;

enables aperture creation after fatigue treatment, by a single reaming operation, rather than with two reaming operations as has been commonly practiced heretofore;

is sufficiently low in cost that it can be cost effectively applied to a number of critical structures, including fuselage structures.

Other important objects, features, and additional advantages of my invention will become apparent to the reader from the foregoing and from the appended claims and the ensuing detailed description, as the discussion below proceeds in conjunction with examination of the accompanying drawing.

SUMMARY

I have now invented, and disclose herein, an improved cold metal working process that uses stress waves to impart beneficial residual stresses to holes and other features in parts subject to strength degradation through stress fatigue. This improved stress wave process does not have the above-discussed drawbacks common to heretofore utilized cold working methods of which I am aware. The process overcomes the heretofore-encountered shortcomings of cold working processes. Also, it eliminates undesirable equipment necessary for the more commonly utilized alternative processes, such as the need for bulky hydraulic equipment, precision mandrels, disposable split sleeves and messy lubricants. Thus, it is believed that my novel method will substantially reduce manufacturing costs. In addition, my stress wave process is readily adaptable to use in automated manufacturing equipment. As a result, the unique process described herein is a major improvement over other processes in common use today, including mandrel processes.

My improved stress wave method imparts beneficial stresses using a dynamic indenter that impinges the surface of the metal, preferably in a normal direction to the surface. The action of the probe causes waves of elastic and plastic stress to develop and propagate through the metal. In some cases a stationary indenter is used to support thin workpiece materials. Such "backing" indenters also assist in the reflection and or creation of plastic wave of or from the other side of the workpiece.

After a properly applied and focused plastic stress wave has imparted a large zone of residual stress, the area is now ready for the hole. A drill, reamer or other cutting device is positioned concentric to the impact zone from the probe and anvil. When the hole is machined a small rebound of the stresses surrounding the hole occurs. Such rebound manifests itself as shrinking of the machined hole. For this reason, the cutting tools used in my stress wave method may require the use of a feature that takes into account the inward metal movement in a hole. Otherwise, the workpiece material has the possibility of binding on the cutting tool. This could lead to short tool life or poor hole finish. For a drill or reamer, a simple solution to this requirement is to provide a back-taper feature. As a result, substantially uniform beneficial residual compressive stresses remain in the finished structure.

BRIEF DESCRIPTION OF THE DRAWING

The file of this patent contains six (6) drawings executed in color. Copies of this patent with color drawings will be provided by the Patent and Trademark Office upon request and payment of the necessary fee.

FIG. 6 is a partial cross-sectional view, showing an optimized tooling indenter as taught herein, and indicating key parameters for shaping such a tool.

FIG. 7 illustrates the set-up step for utilizing my stress wave method in a small aperture on a relatively thin workpiece.

FIG. 8 illustrates the step of impacting one-side of a workpiece with an indenter to create a stress wave and form a dimple in the workpiece at a pre-selected location for creation of an aperture.

FIG. 9 represents a workpiece in which a dimple has been formed at a pre-selected location wherein it is desired to create an aperture such as a "rivet-hole".

FIG. 10 illustrates the set-up step for utilizing my improved stress wave method in creation of dimple on a workpiece with an indenter, while utilizing a backing anvil for support of the workpiece, in preparation for forming an aperture in the workpiece at a pre-selected location.

FIG. 38 is modularly exploded cross-sectional view of three workpieces being acted on by a pair of flat cylindrical punch type indenters, showing in detailed color the stress field created in the workpieces by such an indenter.

FIG. 39 is a modularly exploded cross sectional view of three workpiece sheets after being cold worked by a flat cylindrical punch, as shown in FIG. 38, now showing in detailed color the stress field present in the workpieces after drilling to create an aperture through the workpieces.

FIG. 40 is modularly exploded cross-sectional view of three workpieces being acted on at the obverse and reverse sides by a pair of optimized shape indenters, showing in detailed color the stress field created in the workpieces by such indenters.

FIG. 47 is semi-log graphical plot of the maximum net stress versus cycles to failure for (a) untreated sample results reported by The Boeing Company, (b) samples results reported by Boeing for parts treated by cold expansion; (c) untreated control samples of the type treated and tested herein, and (d) results for sample structures treated by the improved stress wave method taught herein.

DESCRIPTION

In my novel, revolutionary cold metal working process, stress waves are effectively utilized to impart beneficial residual stresses to holes and other features in parts that are subject to strength degradation resulting from fatigue damage. The stress wave method imparts beneficial stresses using a dynamic indenter that impinges the surface of a workpiece, normal to the surface of the workpiece. The action of the dynamic indenter on the workpiece at a selected velocity and with sufficient force causes waves of elastic and plastic stress to develop and to propagate through the workpiece.

Unlike the various prior art methods, I have discovered that by carefully controlling the amount and distribution of pressure applied to a workpiece, the resulting residual stress in the workpiece can be substantially stratified, in cross-section, so that a substantially uniform residual tangential stress is maintained along the sidewall profile of an aperture through a structure. To understand this phenomenon, it is helpful to look at FIG. 1, which shows a summary of normalized contact pressure distribution, $\sigma_2/P_m$, at radial distance from a punch centerline, for a structure undergoing deformation by (a) a cone, (b) a sphere, and (c) a circular, flat bottomed punch. When using a punch 60 having a circular, flat bottom 62 as as depicted in FIG. 2, the pressure is relatively uniform only near the center of the area of engagement, and increases exponentially near the edge of the contact area, where shearing tends to occur, as indicated by broken line 64 in FIG. 1. Thus, flat cylindrical indenters are efficient at imparting large zones of residual stresses in thick sheets as they displace material uniformly over their entire surface area. Unfortunately, the edge at the periphery of the end of the flat cylindrical indenter shears the edge of the surface of the stricture being worked, leading to a much small zone of residual stress at the surface of a workpiece. As a result, the reduced amount of residual stress (as more particularly seen in FIGS. 38 and 39, discussed hereinbelow) leads to a reduced fatigue life of a structure fabricated using such method.

Figure 1:
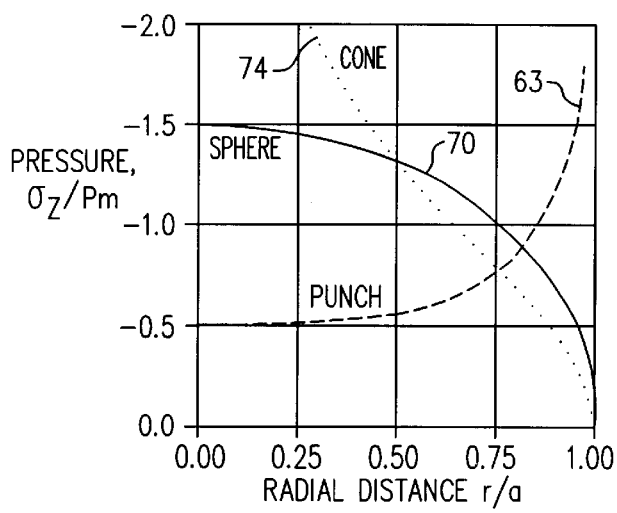
FIG. 1 shows a summary of normalized contact pressure distribution, $\sigma_z/P_m$, at radial distance from a punch centerline, for a structure undergoing deformation by (a) a cone, (b) a sphere, and (c) a circular, flat bottomed punch.
Figure 2:
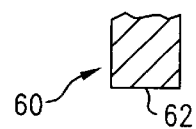
FIG. 2 is a vertical cross-section of a flat bottom circular punch, of the type which displays the curve depicted in FIG. 1 when cold working metal.
Figure 3:
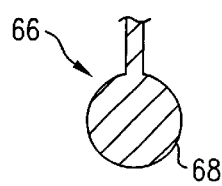
FIG. 3 is a vertical cross-section of a spherical bottom bunch, of the type which displays the curve depicted in FIG. 1 when cold working metal.

When using a punch 66 with a spherical bottom shape 68, as shown in cross-section in FIG. 3, increased pressure is seen at the center of the contact area (reference line 0.00 in FIG. 1), and the contact pressure drops off exponentially toward the edge of the contact area, as indicated by solid line 70 in FIG. 1. Resultingly, indenters with spherical end shapes provide large zones of beneficial residual stresses at the sheet surface, but lack the ability to treat thick structures because of the reduced contact area associated with the spherical shape. Also, such spherical indenter shapes tend to induce large amounts of upset at the surface of a workpiece, which may require further attention in order to provide a suitable final product.

Figure 4:
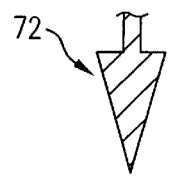
FIG. 4 is a vertical cross section of a cone shaped punch, of the type which displays the curve depicted in FIG. 1 when cold working metal.

If a cone shaped punch 72 is utilized, as depicted in cross section in FIG. 4, the pressure exerted by the punch 72 is very high toward the center of the contact area, but drops off sharply toward the edge, as indicated by dotted line 74 in FIG. 1. Such cone shaped indenters are not very effective at producing desirable residual stress profiles, since they tend to tear the surface and move it radially outward.

Figure 5:
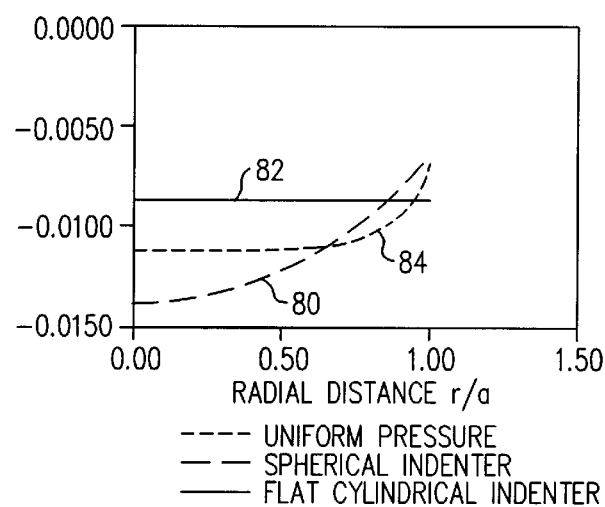
FIG. 5 is graphical illustration of the deflection of a workpiece structure, at radial distance from a punch centerline, for a workpiece structure undergoing deformation by (a) a flat bottom cylindrical indenter, with a configuration such as is illustrated in FIG. 2 above, (b) a spherical bottom indenter such as is illustrated in FIG. 3 above, and (c) an optimized, uniform pressure type indenter as taught herein, one embodiment of which is illustrated in FIG. 6 below.

In my method of producing beneficial stresses at desired locations in structures, it is instructive to examine the amount of deflection achieved on a workpiece by a properly optimized indenter tool shape. This phenomenon is graphically represented in FIG. 5, which compares the amount of deflection achieved at radial distance from the centerline of a contact surface area being acted upon by spherical, flat, and optimized indenters. The deflection achieved by a spherical indenter of shape such as is depicted in FIG. 3, is shown in line 80 of FIG. 5. The deflection achieved by a flat bottomed cylindrical indenter, such as is depicted in cross-section in FIG. 2, is shown in line 82 of FIG. 5. Importantly, the generalized pressure profile of my improved, optimized indenter which provides uniform pressure across the contact surface areas results in deflection in a workpiece that, at the center of the contact area, results in more deflection than that achieved by a traditional prior art flat bottomed punch, but at the edge of the contact area, results in less deflection (and hence, less shearing) than that achieved by a traditional flat bottomed punch. See FIG. 5, broken line 84 which depicts the variable deflection achieved by my optimized indenter when acting on a workpiece.

FIG. 6 is a partial cross-sectional view, showing an optimized tooling indenter as taught herein, and indicating key parameters for shaping such a tool. For purposes of this discussion, FIG. 6 is best envisioned as depicting in one-half cross-section a circular indenter 90 or punch with a contact face 92 with shaped profile, in the radially outward direction, as further discussed 92 hereinbelow. The overall radius is a, and the instantaneous radius is r at any pre-selected location in the radially outward direction along the contact face 92. The initial mean contact pressure, $P_M$, for initial yield (indentation) is in the normal direction z, and is indicated by the downward arrow in FIG. 6, and such mean contact pressure is provided by the instantaneous contact pressure $\sigma_z$ at any point in the along the profile of contact face 92, or more generally shown below, in the contacting end 94 of the indenter 90.

In one embodiment, a preferred indenter 90 contact face 92 profile shape is determined from the deflected shape of a dimple induced by a uniform pressure acting on a selected workpiece. By selecting the deflected shape for a pre-selected depth of indentation in a workpiece resulting from uniform pressure as the shape for the contact face profile 92 of the contacting end 94, the optimum shape for my improved indenter can be determined. Such deflected shape, or, more precisely as shown, the shape for the contract face profile 92 in tool 90, is given by the elliptical integral as follows:

$$u_z = \frac{C(4(1-v^2))P_M a}{E} \int_0^{\pi/2} \sqrt{1 - \frac{r^2}{a^2}\sin^2\theta} \, d\theta$$

Where:
a=a pre-selected radius of uniform pressure
C=a constant related to optimum depth in selected material to create pre-selected stress levels in a selected workpiece, ranging from about 1 to about 4
E=Elastic modulus
$P_M$=contract pressure distribution
r=radial distance
$u_z$=normal displacement of the workpiece
v=Poisson's Ratio Since beneath the indenter 90 at the center of contact face profile 92, i.e., the center of contact where r=0, the normal displacement measured with respect to the first surface of a workpiece is given by the following expression:

$$u_z = \frac{2(l-v^2)P_M a}{E}$$

At the outer edge of the dimple (where r=the total radius a of the indenter), the normal displacement measured with respect to the first surface of a workpiece is given by the following expression: which expression:

$$u_z = \frac{4(l-v^2)P_M a}{E}$$

Overall, the resultant shape of my improved indenter 90 is somewhat similar to a flat punch but with a gradually sloping face 104 along the low radial distance (r/a) points (up to about r/a 0.66 or slightly more), and a somewhat radiused edge face 106 along the high radial distance (r/a) points (where r/a is over about 0.66 or is in excess of about 0.75 or so).

Figure 14:
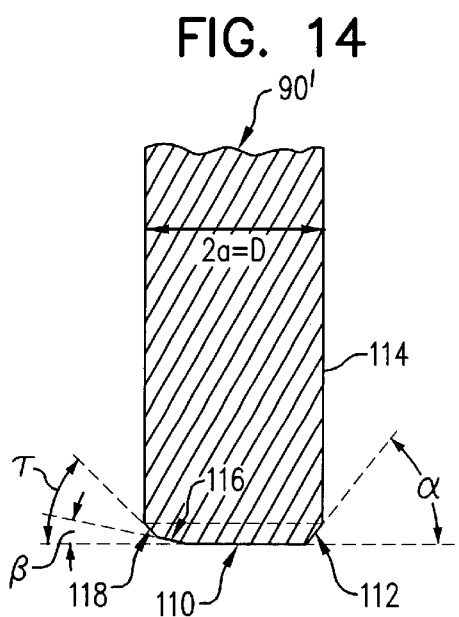
FIG. 14 illustrates another embodiment of my optimized indenter for use in stress wave cold working to create desirable residual stress patterns in a workpiece; in this embodiment, one or more chamfers are used at the edges to approximate a desirable curvature near and at the edge of the indenter.

Another embodiment of an indenter 90', slightly easier to manufacture, is shown in FIG. 14. In this embodiment, the contact face profile 92 discussed above is instead provided by a relatively flat central portion 110, and one or more preferably flat, chamfered edges. Here, one edge 112 is shown on a first side 114 of indenter 90', and two edges 116 and 118 are depicted a second side 120 of indenter 90'. As depicted, edge 112 is offset from flat central portion 110 by an angle alpha ($\alpha$), which is preferably in the 30 degree to 60 degree range. Also, edge 116 is offset from the flat central portion 110 by an angle beta ($\beta$), which is preferably provided in the range from about zero degrees up to about fifteen degrees. In those tools in which a second chamfer is desired, the second chamber angle tau ($\tau$) is generally about the same as alpha, or from about 30 up to about 60 degrees.

Figure 15:
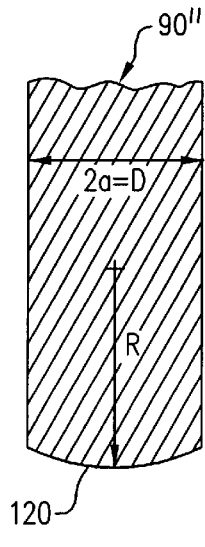
FIG. 15 illustrates yet another embodiment of my optimized indenter for use in stress wave cold working to create desirable residual stress patterns in a workpiece; in this embodiment, the indenter utilizes a pre-selected radius of curvature.

In FIG. 15, yet another embodiment of my indenter 90" is illustrated. Depending upon the materials of construction of a particular structure, and on the amount of beneficial residual stress necessary to provide in the workpiece to be used in such structure, in some cases it may be possible to achieve the results taught herein, at least to some significant degree, via use of a simple indenter 90" with a rounded contacting end 120. In such cases, I have found that the shape of the contacting end 120 can be described as having a curvature of radius R, where radius R is equal to or between 2D and 8D. When restated in terms of radius as shown above, R is in the range from (2a) to 8(2a), inclusive, i.e, R is between 4a and 16 a. More preferably, R is between about 3D, and 5 D,and most preferably, R is about 3.2 D.

Turning now to FIGS. 7, 8, and 9, the use of a single dynamic indenter 130 is illustrated for application of the stress wave process via contacting end 131 to a workpiece structure 132. FIG. 7 shows the single, (here, upper) pre-selected indenter 30 of diameter 2a being positioned and aligned over the centerline 134 of a workpiece structure 132 in which an aperture 136 of a preselected diameter $A_D$ is desired. In FIG. 8, the step of dynamically driving indenter 130 in the direction of reference arrow 138 and into the obverse surface 140 of workpiece structure 132 to create a stress wave in workpiece structure 132 is depicted. A stylized view of the stress waves passing through workpiece 132 in response to impact from the dynamic indenter 130 is shown in FIG. 9. With a sudden compressive impact, such as by a dynamic indenter 130 on workpiece 132, an elastic wave of compression 150 hits the workpiece, and moves through the thickness T of the workpiece. This is followed by a plastic wave 152 which travels more slowly. The elastic wave moves through the metal at a velocity of $$c=(E/\rho)^{1/2}$$

where c=the speed of sound in the material, and

ρ=the material density

The velocity of the plastic wave front is a little more complex, and is generally represented as follows:

$$C=[S(\epsilon)/\rho]^{1/2}$$

where

S(ε)=the modulus of deformation (elastic or plastic), which is equal to the change in stress divided by the change in strain speed, (dσ/dε).

In my improved stress wave process, it is important to note that by shaping contacting end 131 of the indenter 130, the stress wave is focused normally along the direction z of the impact of the indenter 130 on workpiece 132, and between the contacting end 131 of the indenter and the first or obverse surface of the workpiece 132.

Figure 11:
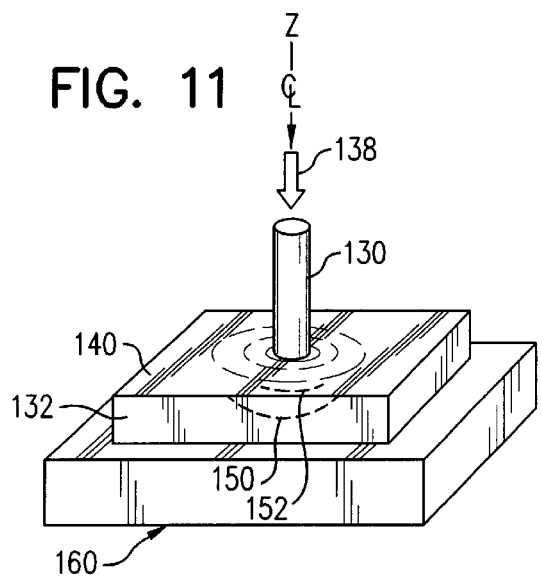
FIG. 11 illustrates the step for utilizing my stress wave method by impacting one-side of a workpiece with an indenter to create a stress wave and form a dimple in the workpiece at a pre-selected location where it is desired to create an aperture such as a "rivet-hole".

Turning now to FIGS. 10 and 11, a slightly different method is illustrated, wherein the workpiece 132 is provided with a backing anvil 160 to support the workpiece 132 from the second or reverse side 162 of workpiece 132. In FIG. 10, the set-up step for utilizing my improved stress wave method in creation of dimple on a workpiece with an indenter 130 is shown, in preparation for forming an aperture in the workpiece at a pre-selected location. FIG. 11 illustrates the step of impacting one side of workpiece 132 with indenter 130 to create a stress wave and form a dimple in the workpiece 132 at a pre-selected location where it is desired to create an aperture such as a "rivet-hole".

Figure 12:
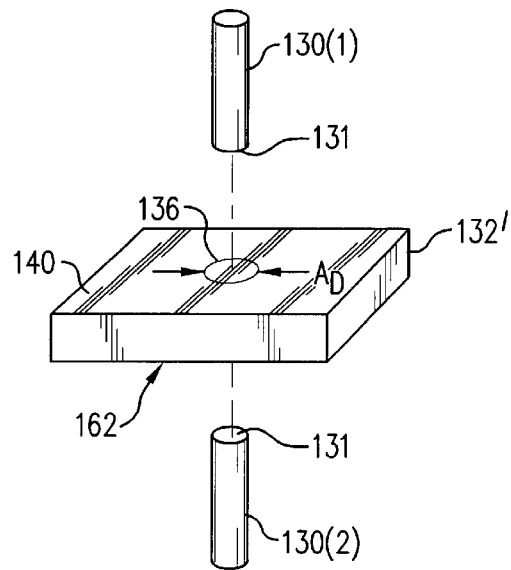
FIG. 12 illustrates the set-up step for utilizing my improved stress wave method for impacting both the obverse and the reverse sides of a workpiece with an indenter to create a stress wave and form dimples in both sides of the workpiece at a pre-selected location where it is desired to create an aperture such as a "rivet-hole".
Figure 13:
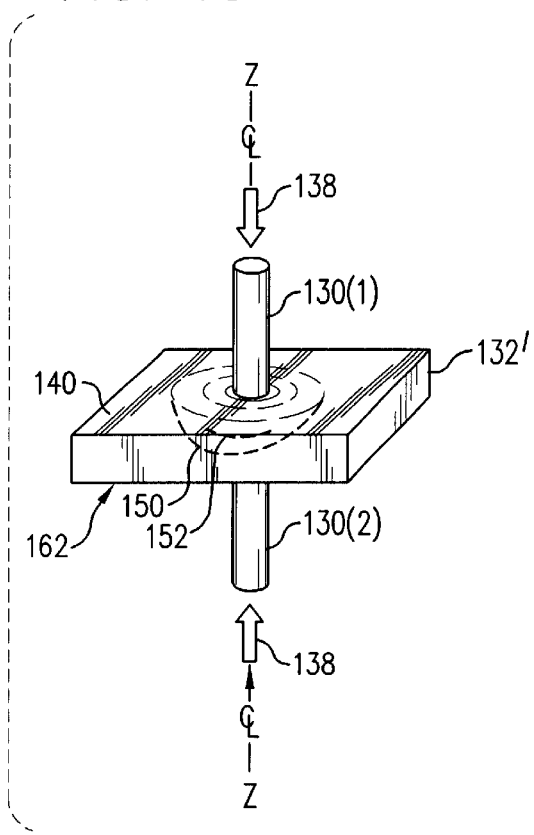
FIG. 13 illustrates the step of impacting both the obverse and the reverse sides of a workpiece with an indenter to create a stress wave and form dimples in both sides of the workpiece at a pre-selected location where it is desired to create an aperture such as a "rivet-hole".

In FIGS. 12 and 13, the two-sided method of using my improved stress wave method for impacting both the obverse 140 and the reverse 162 sides of a workpiece 132 with a first indenter 130(1) and a second indenter 130(2) to create a stress wave and form dimples 170 (see FIG. 18) in both sides of the workpiece at a pre-selected location where it is desired to create an aperture A such as a "rivet-hole" of diameter $A_D$. The step of both the obverse 140 and the reverse 162 sides of a workpiece 132 with indenters 130(1) and 130(2), respectively, to create a stress wave 150 and form dimples 170 in both sides of the workpiece 132 at a pre-selected location where it is desired to create an aperture such as a "rivet-hole". This technique is shown in additional detail in FIGS. 16, 17, 18, and 19, wherein the indenters 130(1) and 130(2) are shown in partial cross-sectional view. Another aid to understanding the improvement offered in the art by my process is to look at FIG. 17, wherein workpiece 132' is being impacted by the indenters 130(1) and 130(2). Reference arrows 200, 202, 204, and 204 depict equal impact pressure lines experienced by workpiece 132'. It is important to note that workpiece 132' is not indented by an equal amount in the z direction (normal direction) when examined from side to side along the radial distance r/ of the indenter, as earlier presented in FIG. 5. In other words, the length of reference arrow 200, from indenter 130(1) to indenter 130(2), is longer than radially inward reference arrow 202, which also extends from indenter 130(1) to indenter 130(2), y direction (side-to-side). Similarly, the length of reference arrow 206, from indenter 130(1) to indenter 130(2), is longer than radially inward reference arrow 204 also extending from indenter 130(1) to indenter 130(2). Thus, equal pressure at the radial positions indicated by reference arrows 200, and 202 results in unequal deformation of the workpiece 132'. The idealized slope of this curve, for one embodiment of my invention, was earlier described in FIG. 6.

Figure 16:
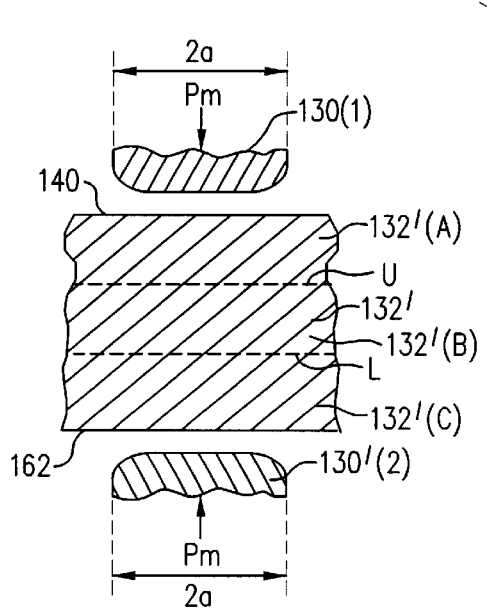
FIG. 16 is a vertical cross-sectional view of a first and of a second optimized shaped indenter in the set-up step for utilizing my improved stress wave method for forming a dimple in both the obverse and reverse sides of a workpiece at a preselected location where it is desired to create an aperture.
Figure 17:
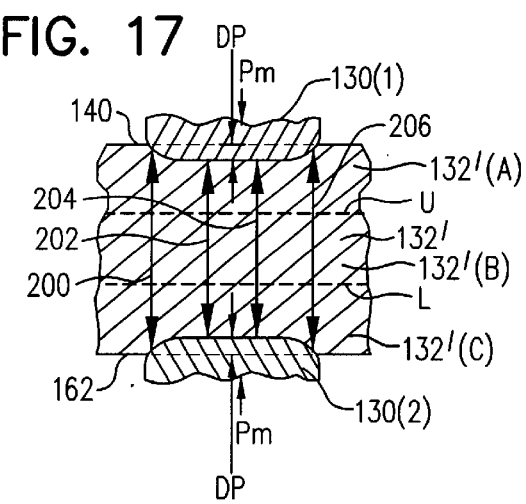
FIG. 17 is a vertical cross-sectional view of a first and of a second optimized shaped indenter during the step of impacting a workpiece to form a dimple in both the obverse and reverse sides of the workpiece at a preselected location where it is desired to create an aperture.

Also depicted in FIGS. 16 and 17 are some reference marks for analytical tools further revealed in FIGS. 38 through 43. It can be observed that workpiece 132' is arbitrarily divided into three parts, 132(A), 132(B), and 132(C), as indicated by separation lines U and L. In FIGS. 38 through 43, further discussed below, the separation lines are used to modularly explode stress analysis diagrams of workpiece 132' into three layers, representing parts 132(A), 132(B) and 132(C).

Figure 18:
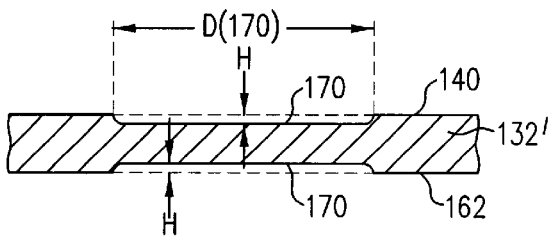
FIG. 18 is a cross-sectional view of a workpiece after formation of dimples in both the obverse and reverse sides.
Figure 19:
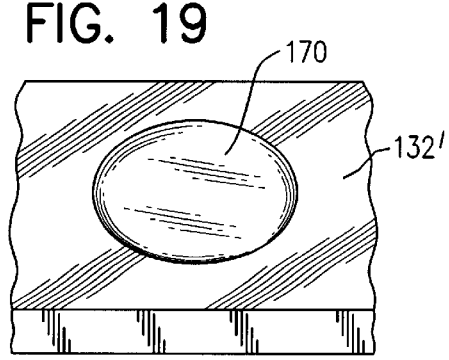
FIG. 19 is a perspective view of a workpiece in which a dimple has been formed a pre-selected location for formation of an aperture in the workpiece.
Figure 20:
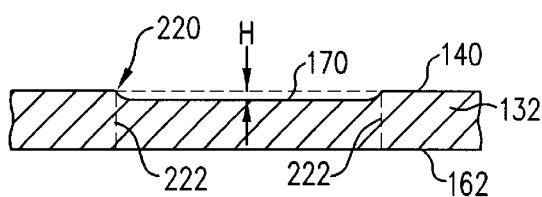
FIG. 20 is a cross-sectional view of a workpiece after formation of dimples in the obverse side.

FIGS. 18 and 20 represent a workpieces 132' and 132, respectively, wherein a dimple 170 has been created in both side of workpiece 132', or in a single side of a workpiece 132, as desired. It is important to note that the actual dimple depth DP when under pressure, as indicated in 17, may be slightly more than the dimple depth H after the indenter 130(1) and/or 130(2) has been withdrawn due to the slight elastic sprinback of the workpiece once the deforming pressure of the indenter(s) has been released.

Figure 21:
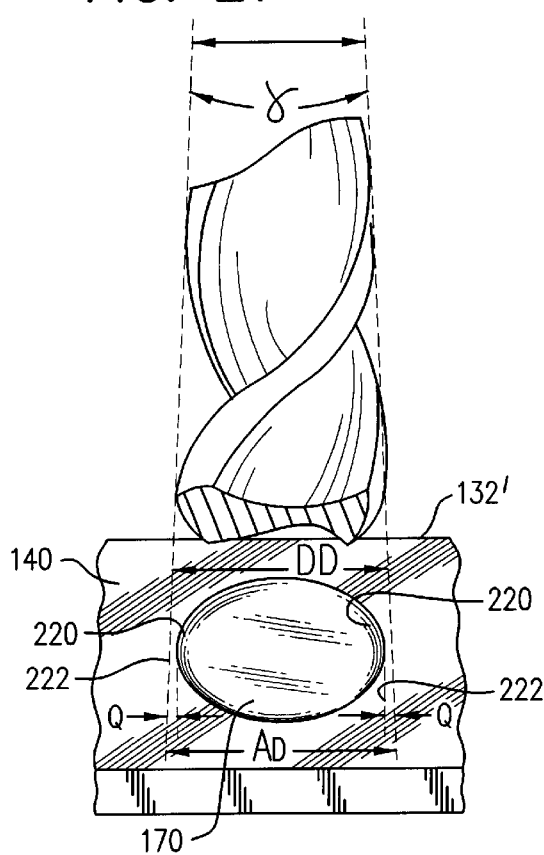
FIG. 21 is a perspective view of the step of drilling an aperture in a workpiece in which a dimple has been formed, in order to create an aperture at a pre-selected location.

As indicated in FIG. 21, a back-taper type drill having a backtaper angle lambda (λ) can be used to advantageously remove unwanted metal in workpiece 132 or 132'. Preferably, the working face diameter of the drill DD used to achieve an aperture of diameter $A_D$ is larger than the dimple diameter D(170) by a distance 2Q, where Q representes the radial distance from the edge 220 of a dimple to the edge 222 of the hole being drilled. In any event, Q is small, but in some cases, may range down to zero.

Figure 22:
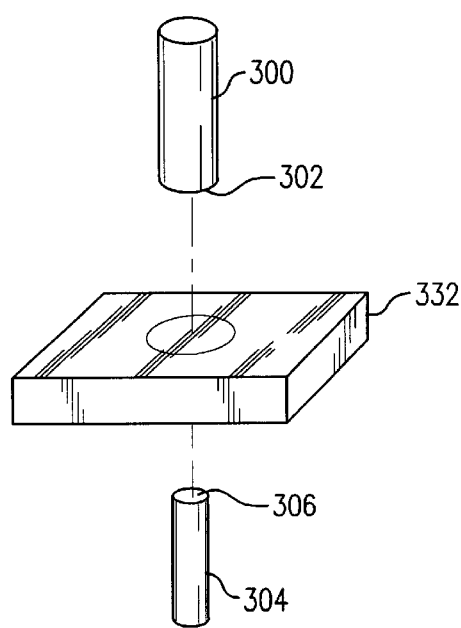
FIG. 22 illustrates the set-up step for utilizing my improved stress wave method for impacting both the obverse and the reverse sides of a workpiece with indenters of a selected, unequal diameter, to create a stress wave and form dimples in both sides of the workpiece at a pre-selected location where it is desired to create a shaped aperture such as a "rivet-hole", particularly for a flush rivet hole.
Figure 23:
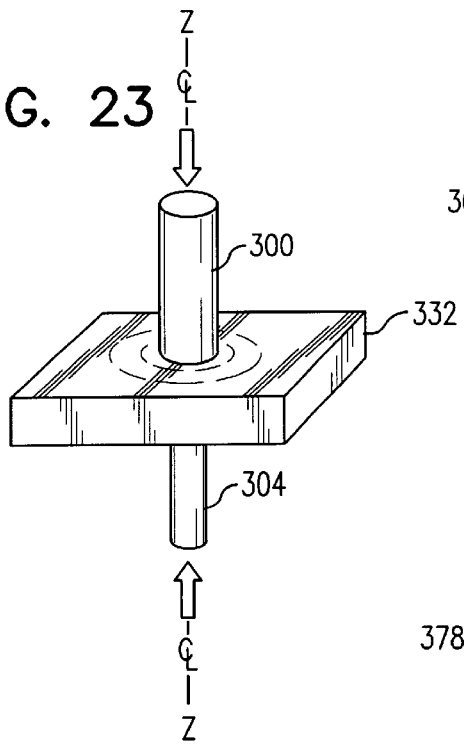
FIG. 23 illustrates the step of impacting both the obverse and the reverse sides of a workpiece with indenters of a selected, unequal diameter, to create a stress wave and form dimples in both sides of the workpiece at a pre-selected location where it is desired to create an apertures such as a "rivet-hole", particularly for a flush rivet hole.

FIGS. 22 through 26 represent variations in my method which may be utilized to achieve desired results in unique situations. First, in FIG. 22, a first indenter 300 with contacting end 302 and a second indenter 304 with a contacting end 306 are provided wherein the contacting end 302 area and the contacting end 306 are of differing surface area. FIG. 22 shows the set-up step for using such differential area indenters, and FIG. 23 illustrates the step of providing a dynamic pulse on the first 300 and second 304 indenters to provide a stress wave on workpiece 332, to create a dimple therein. So, as shown in FIG. 22, the set-up step for utilizing my improved stress wave method allows for the impacting both the obverse and the reverse sides of a workpiece with indenters of a selected, unequal diameter or non-standard shape, to create a stress wave and form dimples in both sides of the workpiece at a pre-selected location where it is desired to create a shaped aperture such as a "rivet-hole", or preferably, a flush rivet hole. FIG. 23 depicts the actual step of impacting both the obverse and the reverse sides of a workpiece with the indenters 300 and 306 of a selected, unequal diameter, to create a stress wave and form dimples in both sides of the workpiece 332 at a pre-selected location where it is desired to create an apertures such as a "rivet-hole" or preferably a flush rivet hole of diameter $A_D$.

Figure 24:
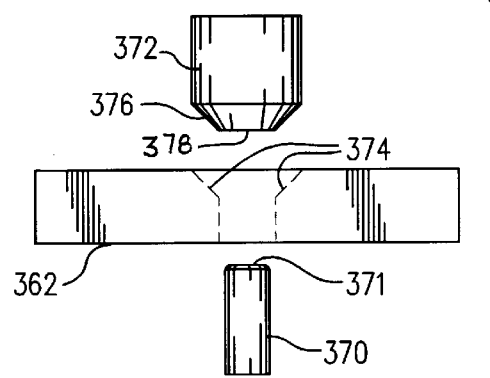
FIG. 24 is a side elevation view of a set-up step for utilizing my improved stress wave method for impacting both the obverse and the reverse sides of a workpiece with indenters of both different shape and of unequal size, to create a stress wave and form dimples in both sides of the workpiece at a pre-selected location where it is desired to create an aperture such as a chamfered "flush-rivet hole".

When chamfered or countersink type rivets are utilized, the set up illustrated in FIG. 24 can be advantageously employed for utilizing my improved stress wave method, to impacting both the obverse 340 and the reverse 362 sides of a workpiece 362 with indenter 370 (with contacting end 371) and indenter 372 of both different shape and of unequal size, to create a stress wave and form dimples in both sides of the workpiece 362 at a pre-selected location where it is desired to create an aperture such as a countersink 374 edge "flush-rivet hole". In this case, indenter 372 is provided with a beveled edge 376 to impart stresses in the desired direction, as well as in the normal face end 378 of the indenter 372.

Figure 25:
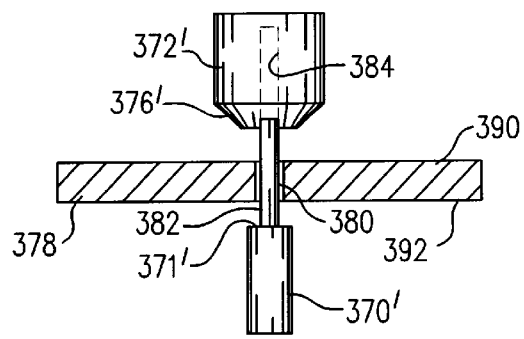
FIG. 25 is a partial cross-sectional view, illustrating the set-up step for utilizing my improved stress wave method for impacting both the obverse and the reverse sides of a workpiece with indenters which are both of different shape and of unequal size, and where the indenters are centered by use of pilot guide tool received in a centering receiving slot in each indenter.
Figure 26:
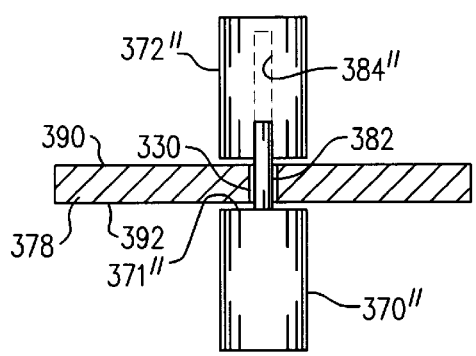
FIG. 26 is a partial cross-sectional view, illustrating the set-up step for utilizing my improved stress wave method for impacting both the obverse and the reverse sides of a workpiece with indenters which are of identical shape and size, and where the indenters are centered by use of pilot guide tool received in a centering receiving slot in each indenter.

FIGS. 25 and 26 show the use of a pilot hole defined by wall 380 in workpiece 378. In FIG. 25, an elongated alignment shaft 382 protrudes through workpiece 278 and is received by companion, complementary sized and shaped receiving chamber 384 in indenter 372'. Similarly, in FIG. 26, an elongated alignment shaft 382, preferably affixed to the distal end 371" of indenter 370", protrudes through workpiece 378 and is received in a companion, complementary sized and shaped receiving chamber 384".

Both FIGS. 25 and 26 are partial cross-sectional views which illustrate the set-up step for utilizing my improved stress wave method for impacting both the obverse side 390 and the reverse side 392 workpiece 378 with indenters which are both of different shape and of unequal size, and where the indenters are centered by use of pilot guide tool received in a centering receiving slot in at least one of the indenter.

Figure 27:
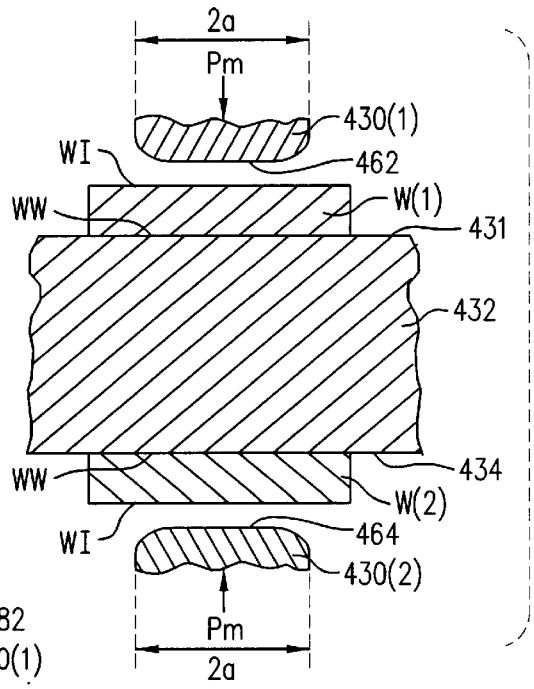
FIG. 27 is a cross-sectional view which shows the set-up step for utilizing yet another embodiment of my improved stress wave method for impacting both the obverse and the reverse sides of a workpiece, utilizing indenters which are both of identical shape, and utilizing a consumable wafer between the indenters and the workpiece.
Figure 28:
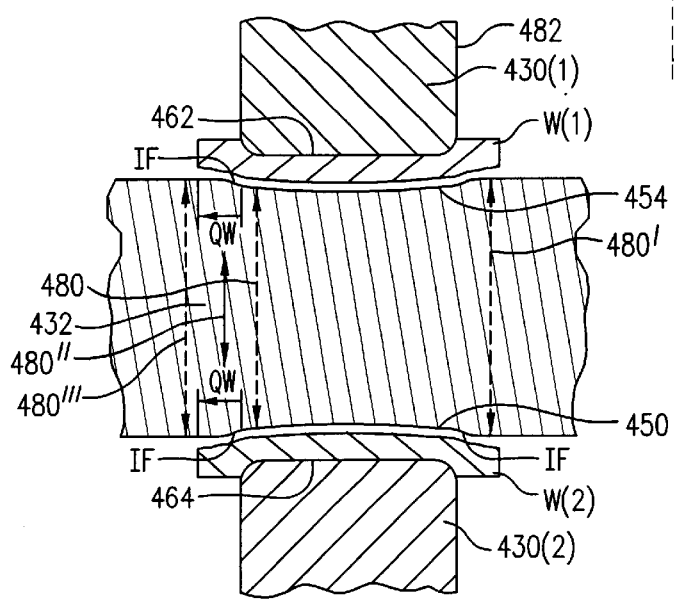
FIG. 28 is a cross-sectional view which illustrates the step of disengaging opposing indenters from their respective consumable wafers on opposing sides of a workpiece, while utilizing my improved stress wave method for impacting both the obverse and the reverse sides of a workpiece to create dimples at pre-selected locations.
Figure 49:
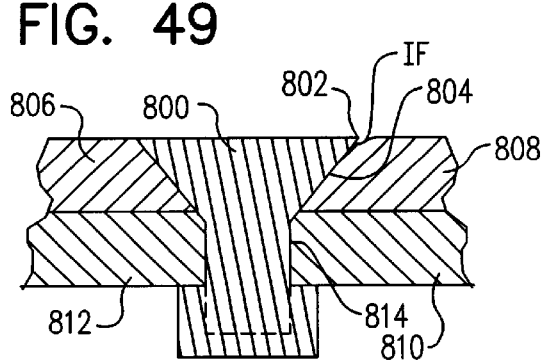
FIG. 49 provides a partial cross-sectional view of a second structure which utilizes a countersunk type fastener to join first and second structural parts, and wherein each of the first and second structural parts have had the fastener apertures prepared by my improved stress wave method, to provide improved fatigue life in the finished structural part.

Turning now to FIG. 27 the set-up step for utilizing yet another embodiment of my improved stress wave method for impacting both the obverse and the reverse sides of a workpiece is depicted. Here, the use of indenters 430(1) and 420(2), which are of identical shape and size, are provided. This variation in my method utilizes a consumable wafer W(1) between the indenters 430(1) and the obverse surface 431 of the workpiece 432. Likewise, a consumable waver W(2) is utilized between the indenter 430(2) and the reverse surface 434 of the workpiece 432. Each of the consumable wafers has a workpiece side WW and an indenter side WI. The workpiece side WW impacts the workpiece, and when the wafer is squeezed between the workpiece 432 and an indenter, the waver W(1) and/or W(2) deforms slightly, spreading the force to the workpiece outward radially a small distance QW from the radius of the indenter utilized, which force decreases rapidly beyond the end of the contacting end 462 or 464 of the respective indenter. After the step of dynamic impacting of the wafers W(1) and W(2), in the manner discussed hereinabove, the step of disengaging the opposing indenters 430(1) and 430(2) is illustrated in FIG. 28. Here, a cross-sectional view shows the disengagement of the opposing indenters from their respective consumable wafers W(1) and W(2) on opposing sides of a workpiece 432, while utilizing my improved stress wave method for impacting both the obverse 431 and the reverse 434 sides of a workpiece 432 to create dimples 450 and 454 at pre-selected locations. It is preferred that the consumable wafers W(1) and W(2) be of the same or a similar material to the material comprising workpiece 432, although it should be understood that the method is not limited thereto, and any material which provides the desired uniformity in resultant residual stress profile, as further discussed herein below, can be utilized. However contact end 462 of indenter 430(1), and contacting end 464 of indenter 430(2), can be selected from a variety of shapes, so long as the pressure distribution to the workpiece 432 is substantially uniform, assuming that straight sides are desired on the apertures being created in the workpiece. Importantly, it should be noted that the actual aperture hole edge location 480 may be located radially inward, of or radially outward of, the peripheral edge 482 of the indenter 430(1) or 430(2). Similarly, the anticipated edge wall location which defines the aperture through workpiece 432 may be radially inward of (wall 480) or within the zone QW earlier discussed (wall 480"), or radially outward of zone QW (wall 480"). The choice of wall location is dependent on various factors, most importantly of course the amount of beneficial residual stress present, after treatment, at the pre-selected wall location, and also whether or not a slight indentation ID would be advantageous at the outer peripheral edge of a fastener. In this regard, see FIG. 49, which shows the peripheral edge 800 of a fastener 802, with a small indentation ID adjacent thereto. FIG. 49 is particularly interesting since it provides an indication that a countersunk type outer edge wall 804 can be prepared according to the methods described herein to provide a desirable beneficial residual stress pattern in the body 806 of structure 808. Likewise, the body 810 of structure 812 adjacent to the more conventional perpendicular edge wall 814 can be treated to provide a desirable beneficial stress pattern in the body 810. More conventionally, as shown in FIG. 49, a fastener 840 having an externally protruding head 842 is provided to join structural members 844 and 846. In such structures, apertures defined by sidewalls 848 and 850, respectively, accomodate the fastener. The beneficial residual stress is advantageously provided in both structural member 844 and 846.

Figure 50:
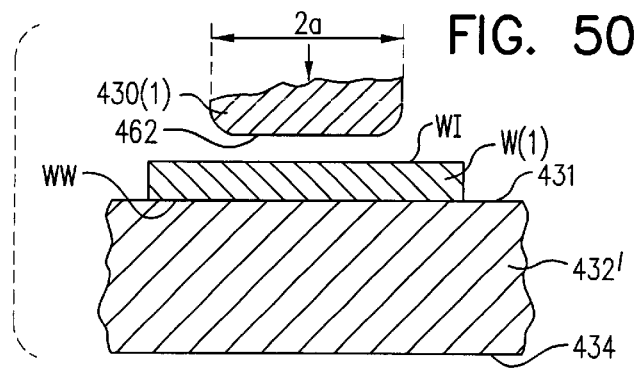
FIG. 50 is a cross-sectional view which shows the set-up step for utilizing yet another embodiment of my improved stress wave method for impacting a single side of a workpiece, here showing work on the obverse side of a workpiece, although the reverse side could similarly be worked, by utilizing one indenter and a consumable wafer between the indenter and the workpiece, in order to provide beneficial residual stress near the fastener apertures in the finished structure.

Although it is generally expected that most structures would substantially benefit from the use of increased fatigue resistance being imparted from both the obverse and the reverse sides, in some applications, there may arise useful results when only a single side is treated by my improved stress wave method. Such one-sided treatment of a structure is depicted in FIG. 50. That cross-sectional view shows the set-up step for utilizing yet another embodiment of my improved stress wave method for impacting a single side of a workpiece 432', by showing work on only the obverse side 431' of that workpiece. The reverse side 434' could similarly be worked, by utilizing one indenter and a consumable wafer between the indenter and the workpiece 432', in order to provide beneficial residual stress near the fastener apertures in the finished structure fabricated from the workpiece 432'.

Figure 29:
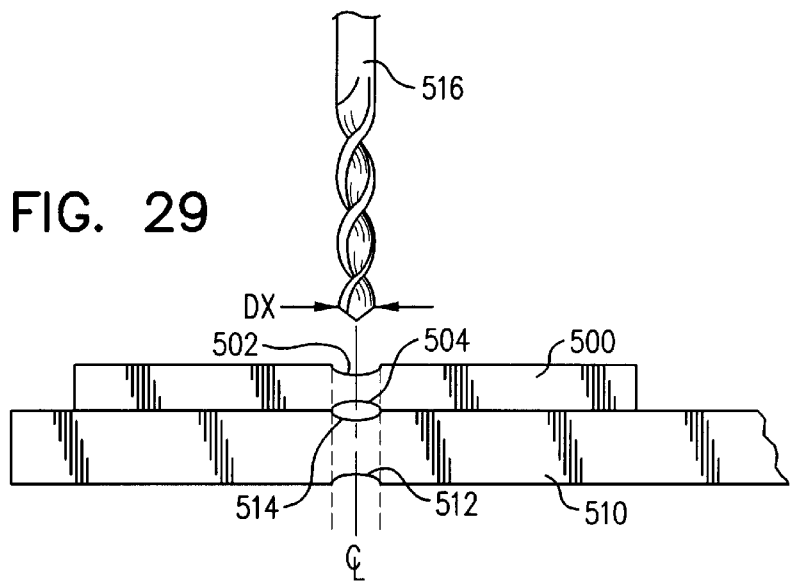
FIG. 29 is a side elevation view which illustrates the set-up step for drilling a pair of workpieces at an aligned, pre-selected location, and using workpieces wherein both have been prepared with dimples in the obverse and reverse side, and wherein the dimples have been centered in order to create beneficial residual stresses at a desired location for lap joint between the first and second workpieces.
Figure 30:
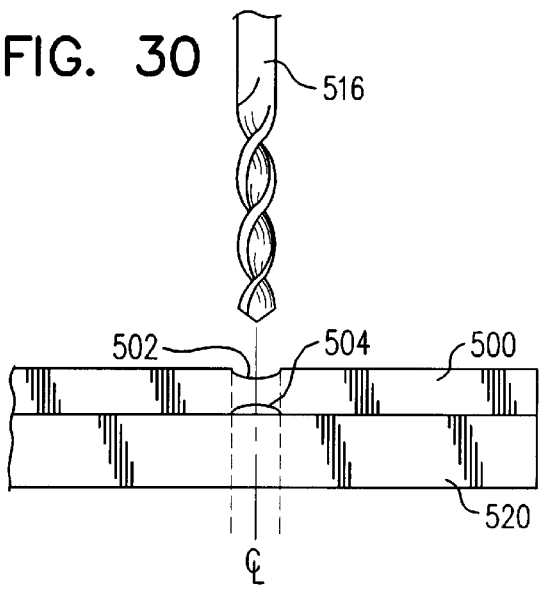
FIG. 30 is a side elevation view which illustrates the set-up step for drilling a pair of workpieces at an aligned, pre-selected location, and using workpieces wherein only workpiece one has been prepared by my improved stress wave method for improved fatigue life, and wherein the dimples in the first workpiece have been centered over a desired location in the second workpiece in order to secure the first and second workpieces at a desired location for the beneficial residual stresses in a joint.

FIGS. 29 and 30 illustrate the set-up step for drilling a pair of workpieces at an aligned, pre-selected location. In FIG. 29, a workpiece 500 having dimples 502 and 504 therein, and workpiece 510, having dimples 512 and 514 therein, are aligned along a centerline so that an concentric apertures can be created through workpieces 500 and 510 by drilling therethrough with drill 516 or preselected diameter DX. Similarly, in FIG. 30, workpieces 500 and 520 (in which no beneficial stress relief pattern has been created) are aligned along a centerline, so that concentric apertures can be created through both workpieces by drill 516. In both FIGS. 29 and 30, lap type joints can be created using at least one workpiece wherein a fastener receiving aperture has been provided with an improved fatigue life, by preparing dimples in the obverse and reverse side, and wherein the wherein the dimples have been centered in order to create beneficial residual stresses at a desired location with respect to the final fastener receiving apertures.

Figure 31:
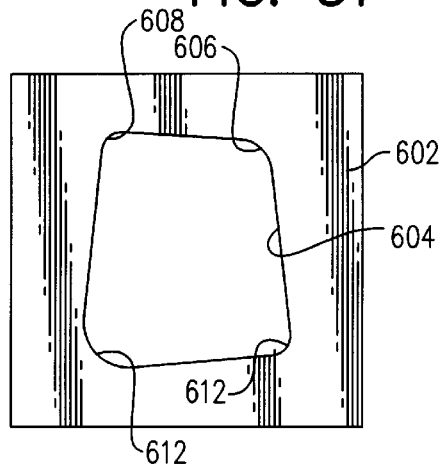
FIG. 31 is a top plan view of a structure with one non-circular hole therein which can advantageously be treated with my improved stress wave process to provide beneficial residual stress levels at desired locations adjacent the interior edge wall of the hole.
Figure 32:
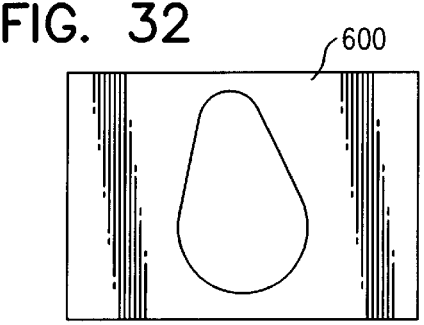
FIG. 32 is a top plan view of yet another structure having a non-circular hole there with can advantageously be treated with my improved stress wave process to provide beneficial residual stress levels at desired locations in the structure.

It is also important to understand that unusual configuration, non-circular type apertures can be treated with my improved stress wave process to provide beneficial residual stress levels at desired locations adjacent the interior edge wall of the hole. In FIGS. 31 and 32, top plan views of two such structures, 600 and 602, are illustrated. In structure 600, an interior side-wall 604 is provided of generally elliptical shape. In structure 602, a parallelogram 604 shaped aperture wall having radiused corners 606, 608, 610, and 612 are provided. Thus, structures having non-circular holes therein can advantageously be treated with my improved stress wave process to provide beneficial residual stress levels at desired locations in the structure.

Figure 33:
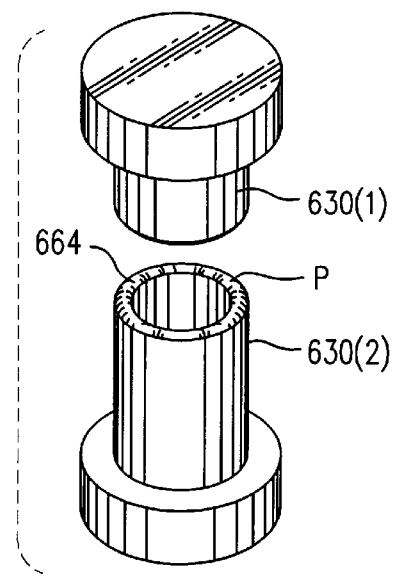
FIG. 33 is a perspective view of a opposing, hollow, oversize indenters which can be shaped, at least along the outer periphery of the indenter, in an optimized manner for treatment of over-sized or non-round holes in a workpiece.
Figure 34:
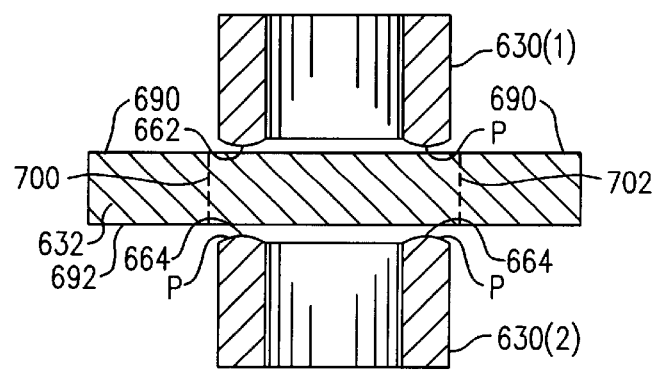
FIG. 34 is a vertical cross-sectional view of a pair of hollow, oversize indenters at the step of being positioned adjacent the obverse and the reverse side of a workpiece, prior to imparting a stress wave on a structure in order to create beneficial residual stress at desired locations in an oversize or non-circular cutout.
Figure 35:
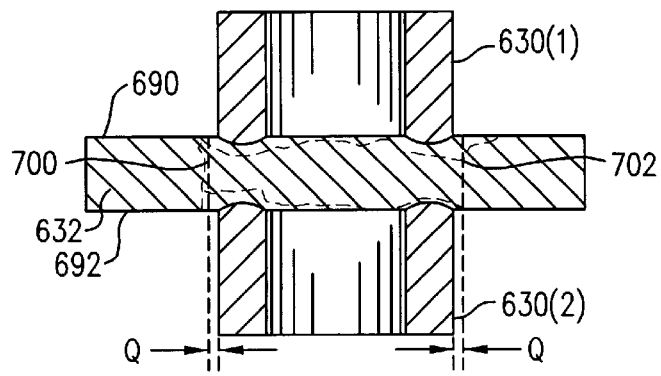
FIG. 35 is a vertical cross-sectional view of a pair of hollow, oversize indenters at the step of impacting the obverse and the reverse side of a workpiece, while imparting a stress wave on a structure in order to create beneficial residual stress at desired locations in an oversize or non-circular cutout.
Figure 36:
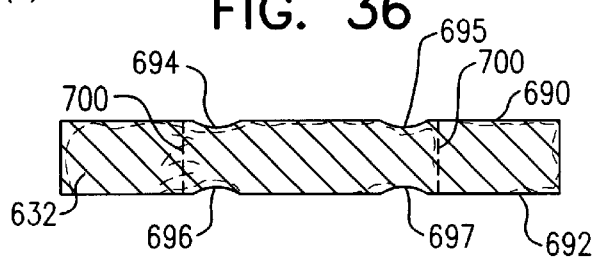
FIG. 36 is a vertical cross-sectional view of the structure just shown in FIGS. 34 and 35 above, but now shown with dimples in the obverse and reverse sides at the locations where my optimized indenters have been utilized to impart beneficial residual stresses in the structure.
Figure 37:
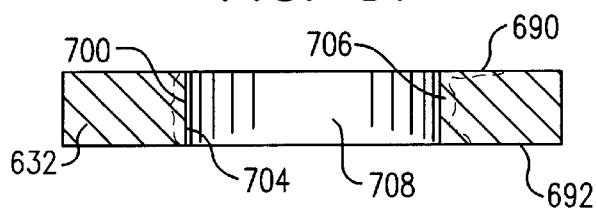
FIG. 37 is the oversize structure first shown in FIGS. 34, 35, and 36, but now showing the structure after cutout of material necessary to form an aperture of a desired size, which structure retains beneficial residual stress substantially uniformly from the obverse side to the reverse side, along pre-selected portions of the interior sidewall that defines the aperture through the structure.
Figure 48:
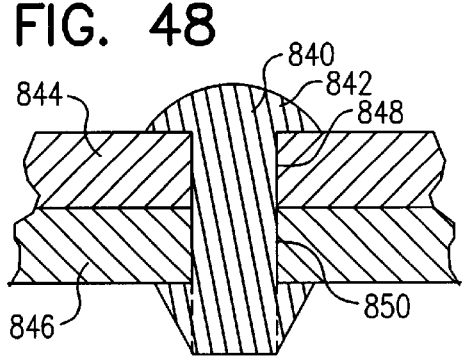
FIG. 48 illustrates a partial cross-sectional view of a structure which utilizes a fastener to join first and second structural parts, and wherein each of the first and second structural parts have had the fastener apertures prepared by my improved stress wave method for imparting beneficial residual stress in a structural part.

In order to provide the beneficial residual stress levels in oversized circular apertures, or in unusual shaped structures, I have found it useful to provide opposing, hollow, oversize indenters as depicted in FIGS. 33, 34, and 35. Such indenters 630(1) and 630(2) can be shaped, at least along the outer periphery P of the contacting end 662 and 664 of the indenters 630(1) and 630(2), respectively, in an optimized manner for treatment of over-sized or non-round holes in a workpiece 632. In FIG. 33, a perspective view of such indenters 630(1) and 630(2) is shown. In FIG. 34, a vertical cross-sectional view of a pair of hollow, oversize indenters 630(1) and 630(2) are shown at the step of being positioned adjacent the obverse 690 and the reverse 692 side of a workpiece 632, prior to imparting a stress wave on a structure in order to create beneficial residual stress at desired locations in an oversize or non-circular cutout. Particularly in FIG. 34, and also throughout following FIGS. 35, 36, and 37, note that the broken lines 700 and 702 indicating the intended dimensions of an interior aperture through the workpiece 632, with that sidewalls 704 and 706 are ultimately created along the lines indicated at 700 and 702. In FIG. 37, an end wall 708 is also shown, which would be at another cross-sectional location at the rear of the indenters shown in the perspective view of FIG. 33. Note that the dimples 694 and 695 on the obverse side 690, and the dimples 696 and 697 on the reverse side 692 are located inwardly (here, radially, with circular indenters) from the broken sidewall indicating lines 700 and 702, so that the beneficial residual stress is at desired locations in an oversize or non-circular cutout.

The treated workpiece 632, before machining for removal of unwanted material, is shown in FIG. 37. The oversize or non-round cutout treatment is finally represented in FIG. 27, showing how interior sidewalls 704, 706, and 708 extend between the obverse and reverse sides of workpiece 632, with beneficial residual stresses in the structure.

Attention is now directed to the series of drawings FIG. 38 through FIG. 43, where the results of my optimized stress wave process can be clearly compared to and its improvement shown over the prior art. A modularly exploded cross sectional view of a stack of three workpiece sheets is shown in FIG. 38 after being cold worked by a flat cylindrical punch. The detailed color code, with a legend on the side indicating beneficial residual stress in pounds per square inch, clearly shows in FIG. 39 that the residual stress field present in the workpieces after drilling to create an aperture in the workpieces provides workpieces only modest beneficial stress increase near the obverse surface, and similarly on modest beneficial stress increase near the reverse surface. However, such prior art techniques create significant benefical residual stress at the mid-plane of the aperture, as is seen in FIG. 39. Unfortunately, this allows fatigue cracks to initiate at the surface (either obverse or reverse sides) and grow.

Figure 41:
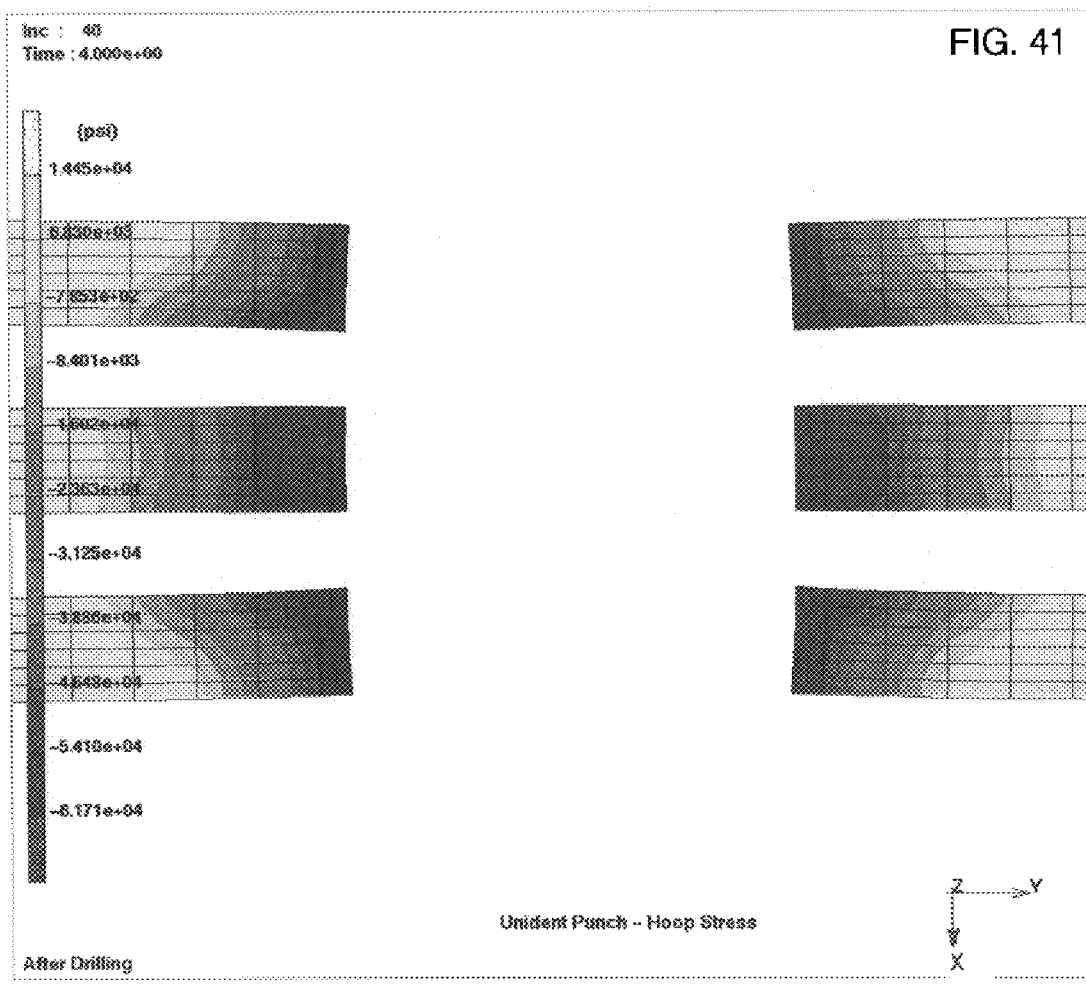
FIG. 41 is a modularly exploded cross-sectional view of three workpieces after being cold worked by a pair of optimized shape indenters, as shown in FIG. 40, now showing in detailed color the stress field present in the workpieces after drilling to create an aperture in the workpiece.

In contrast, with my optimized indenter, and using the method taught herein, by examining closely the results shown in FIG. 40 and FIG. 41, it can be clearly seen in this modularly exploded cross-sectional view of three workpiece sheets being acted on at the obverse and reverse sides by an optimized indenter, that beneficial residual stress is imparted substantially uniformly throughout the workpiece structure. Particularly in FIG. 41, it can be seen that workpiece after drilling to create an aperture in the workpiece, provides a uniform beneficial residual stress profile.

Figure 42:
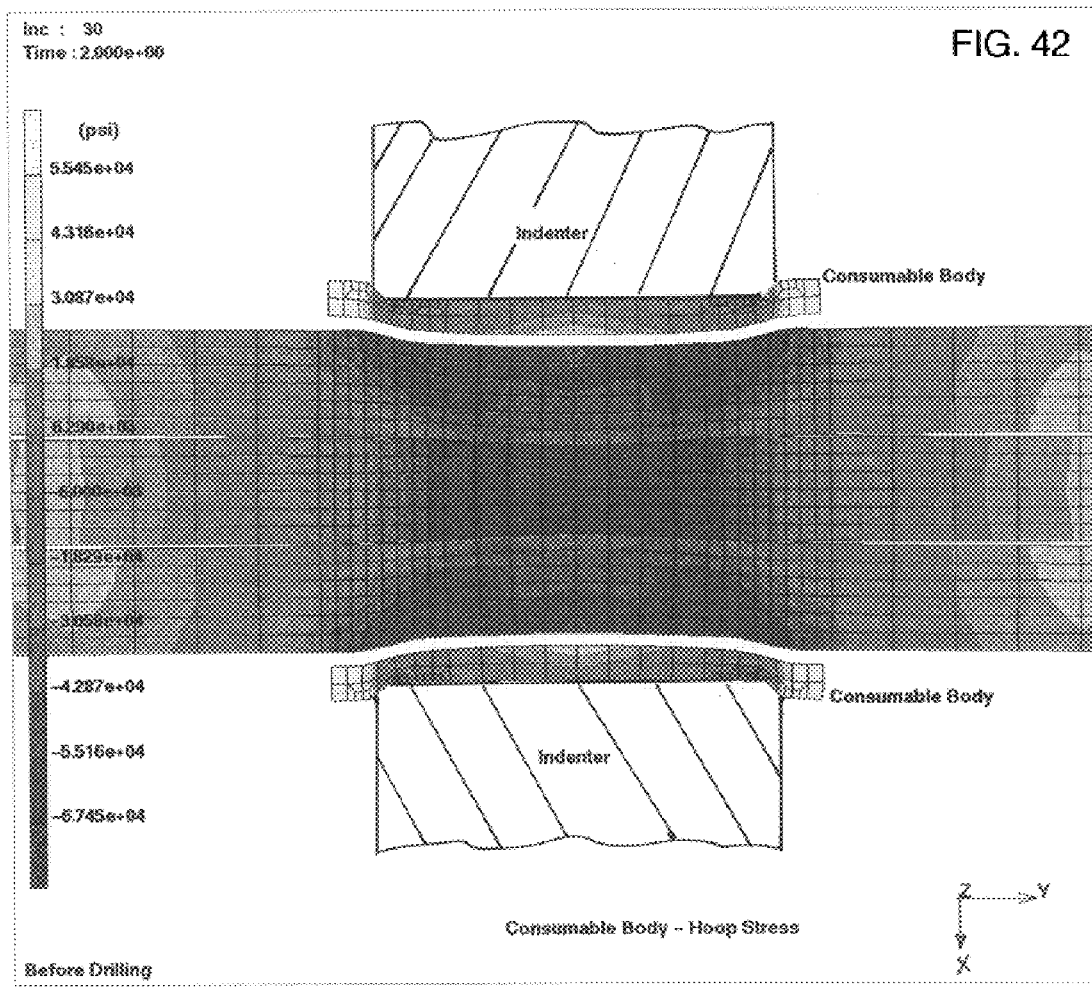
FIG. 42 is a modularly exploded cross-sectional view of three workpieces after the step of stress wave input to the workpieces by utilizing indenters and a consumable wafer body between the workpieces and each of the indenters, as the desirable deformation is imparted into both the obverse and reverse sides of the three workpiece package.
Figure 43:
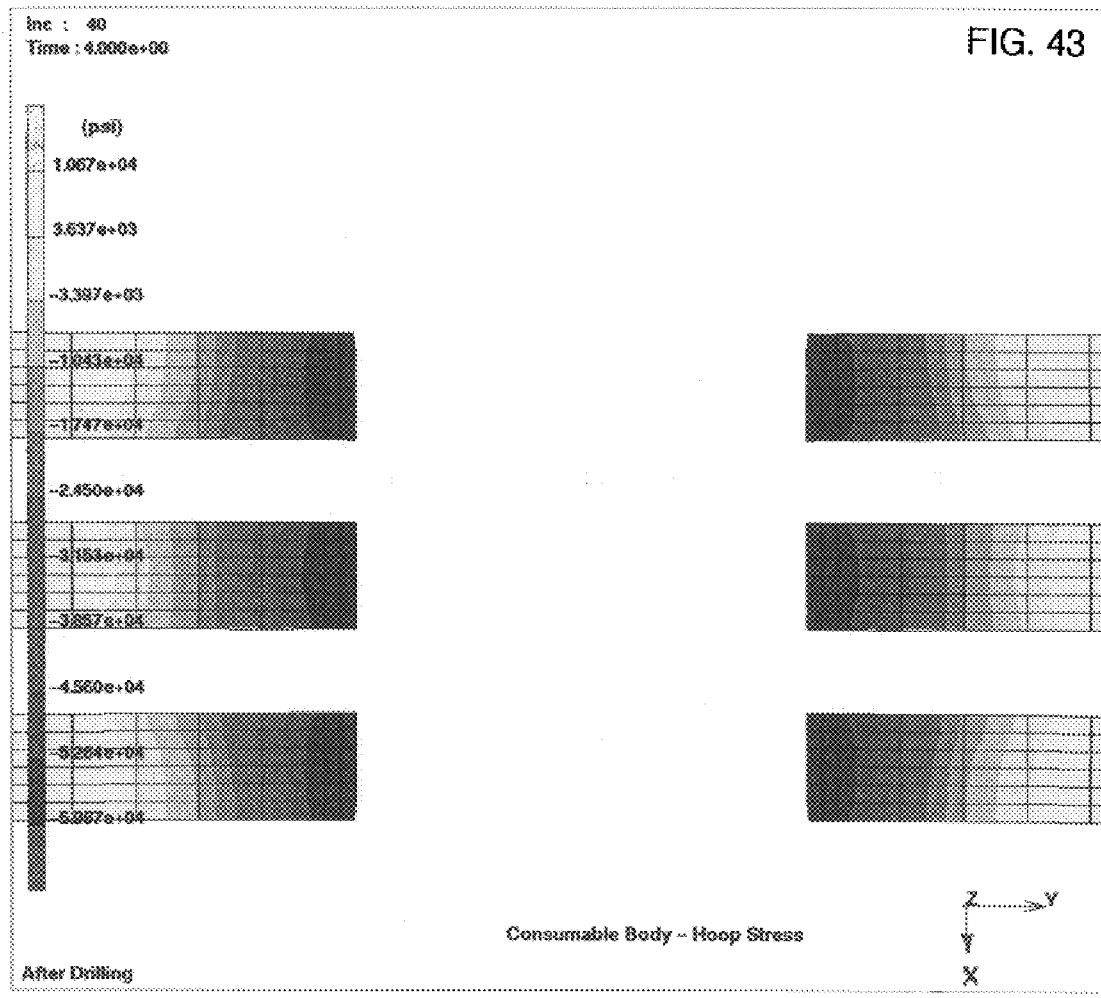
FIG. 43 is a modularly exploded cross-sectional view of three workpieces after the step of drilling an aperture at a pre-selected location in a workpiece, after the step shown in FIG. 42 of utilizing indenters and a consumable wafer body between the workpiece and each of the indenters, and now clearly showing the desirable and beneficial residual stress pattern provided substantially uniformly along the interior edge wall of the aperture in the workpiece.

In one particularly advantageous embodiment, depicted in FIGS. 42 and 43, an exploded cross-sectional view is shown of three workpiece sheets after the step of stress wave input to the workpiece by utilizing opposing indenters and a consumable wafer body between the workpiece and each of the indenters. Desirable deformation is imparted into both the obverse and reverse sides of the workpiece.

Importantly, FIG. 43 depicts a is a modularly exploded cross-sectional view of three workpieces after the step of drilling an aperture at a pre-selected location in a workpiece, after the step shown in FIG. 42 of utilizing indenters and a consumable wafer body between the workpiece and each of the indenters, and now clearly showing the desirable and beneficial residual stress pattern provided substantially uniformly along the interior edge wall of the aperture in the workpiece. Thus, it can clearly be seen that uniformity is achieved in the sidewall beneficial residual stress.

Figure 44:
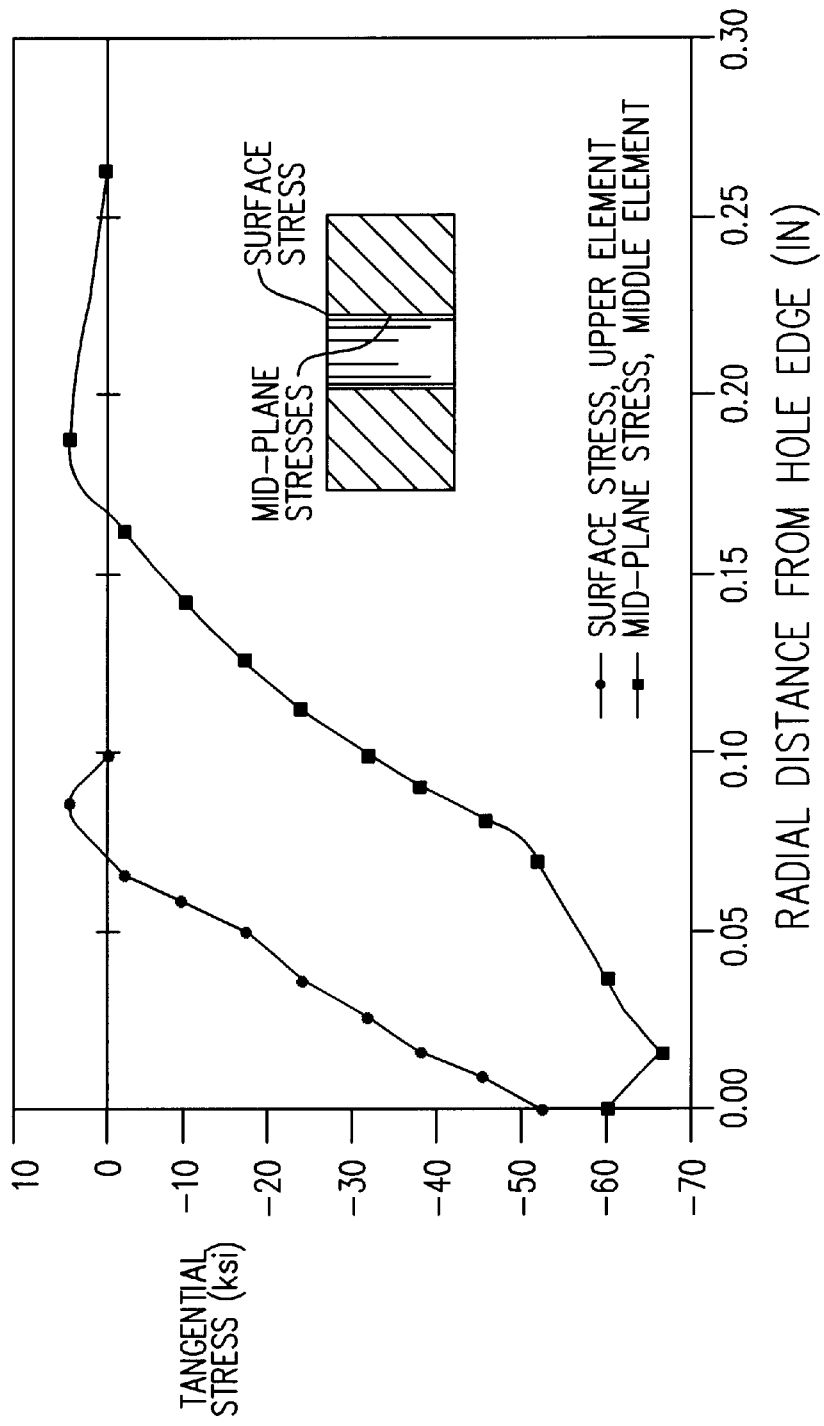
FIG. 44 is a graphical plot of the tangential stress (in thousand pounds per square inch) versus radial distance from a hole (aperture) edge in a structure which has been cold worked by prior art flat bottomed cylindrical mandrel methods.
Figure 45:
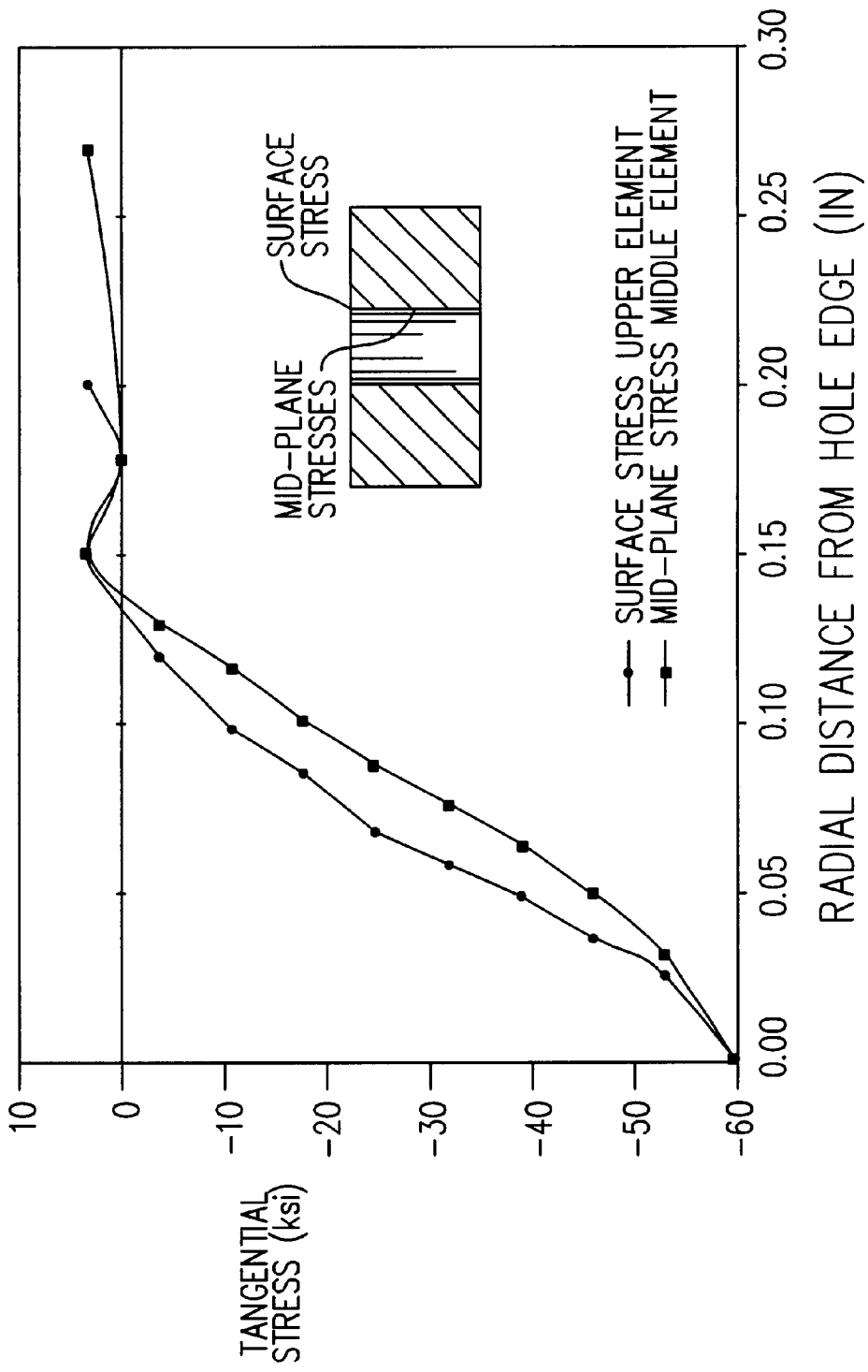
FIG. 45 is a graphical plot of the residual tangential stress versus radial distance from a hole (aperture) edge, in a structure which has been cold worked utilizing one embodiment of my optimized cylindrical indenter in my improved stress wave method.

The above finding can be further confirmed by comparison of FIGS. 44, and 45. In FIG. 44, the graphical plot of the tangential stress (in thousand pounds per square inch) versus radial distance from a hole (aperture) edge in a structure which has been cold worked by prior art flat bottomed cylindrical mandrel methods is shown. Clearly, there is a large departure between stress at some distance from the obverse or reverse surface edge of the hole. However, with my improved stress wave method, and using the my optimized cylindrical indenter, the beneficial residual stress becomes fairly closely matched, between the surface and the mid-plane areas.

Figure 46:
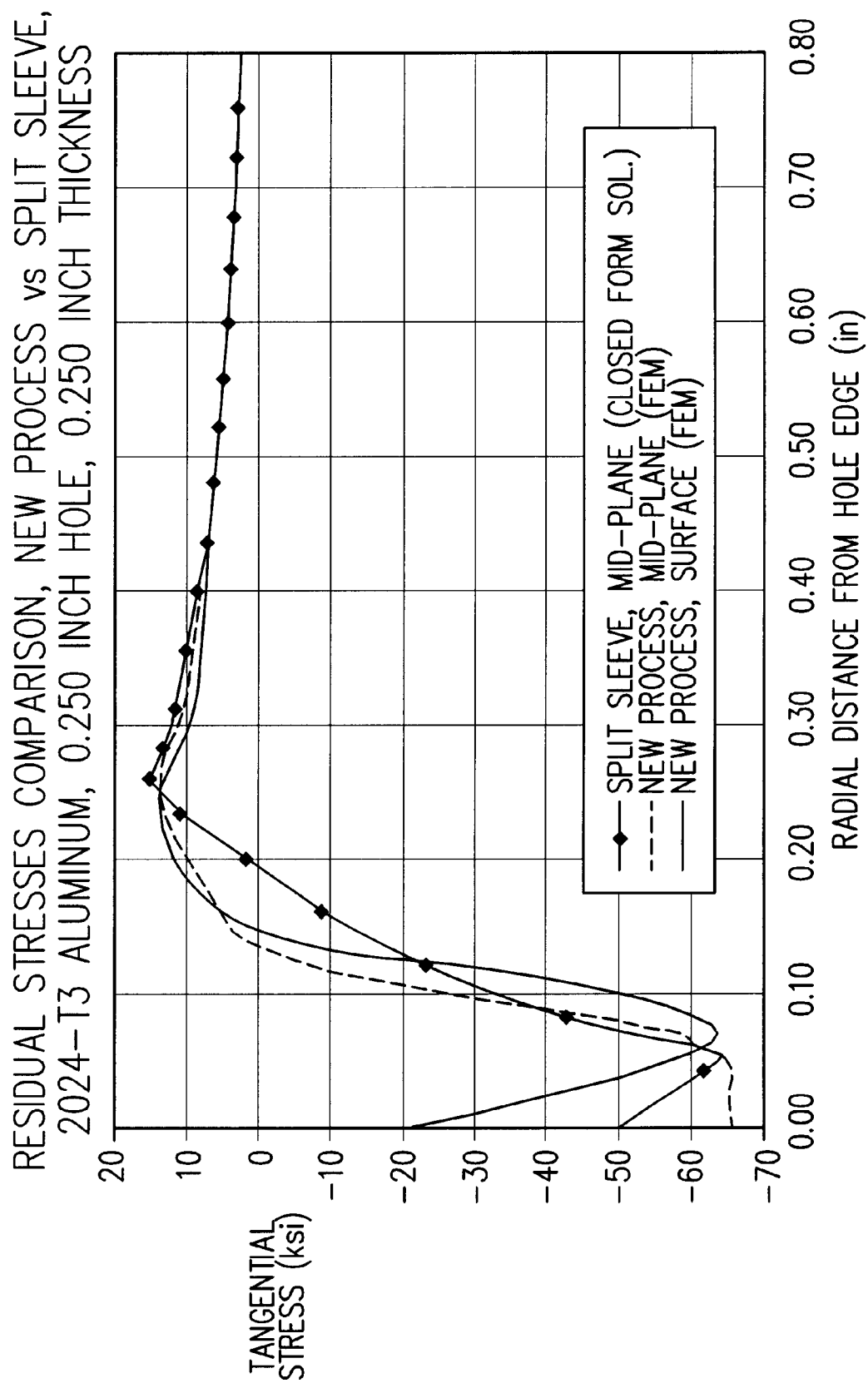
FIG. 46 is a graphical plot of the residual tangential stress versus radial distance from a hole (aperture) edge, in a structure which has utilized the split sleeve method for improving fatigue life, as compared to both surface and aperture mid-plane residual tangential stress results for a structure fabricated utilizing in Type 2024-T3 Aluminum.

In fact, my improved method provides beneficial residual stress at least as good as the split speeve process, as revealed in FIG. 46. In that graph, a plot of the residual tangential stress versus radial distance from a hole (aperture) edge, in a structure which has utilized the split sleeve method for improving fatigue life, as compared to both surface and aperture mid-plane residual tangential stress results for a structure fabricated utilizing in Type 2024-T3 Aluminum.

Most importantly, when direct comparisons of fatigue life are conducted, as is illustrated in FIG. 47, structures prepared by my process clearly show improved fatigue life. FIG. 47 is a semi-log graphical plot of the maximum net stress versus cycles to failure for (a) untreated sample results reported by The Boeing Company, (b) samples results reported by Boeing for parts treated by cold expansion; (c) untreated control samples of the type treated and tested herein, and (d) results for sample structures treated by the improved stress wave method taught herein. My samples showed fatigue life in the 400,000 to 4,000,000 cycles, more or less, depending upon applied loading, and slightly exceeded the predicted life for one of the best commercially employed methods, cold expansion.

It should also be noted that the present invention can be used with any convenient apparatus which results accelerates the indenter with sufficient force to effect the necessary stress wave in the workpiece. In this regard, electromechanical impact type apparatuses such as that revealed the above mentioned Zieve patent, or in the other patents mentioned or otherwise known in the prior art, may be advantageously applied by those of skill in the art and to whom this disclosure is directed, in order to achieve the results and to practice the improved stress wave method taught herein.

It is to be appreciated that my novel stress wave process for cold working parts to reduce fatigue stress degradation of the part, is an appreciable improvement in the state of the art of cold working metal parts subject to fatigue concerns. The stress wave process treats the process of cold working from a new perspective, preferably by entirely treating the hole before it is machined. The stress wave method improves on currently used treatment methods by eliminating expansion mandrels, sleeves, and lubricants.

In my improved stress wave method, control of the magnitude and depth of residual stress is determined by the nature of the stress wave, and not by tooling tolerances. Importantly, the stress wave process is readily automated and can be put into any automated fastening environment. The stress wave process also eliminates distortions and tears around the holes caused during expansion by mandrel methods. Although only a few exemplary embodiments of this invention have been described in detail, it will be readily apparent to those skilled in the art that my novel stress wave cold working process, and the apparatus for implementing the process, may be modified from those embodiments provided herein, without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, the claims are intended to cover the structures described herein, and not only structural equivalents thereof, but also equivalent structures. Thus, the scope of the invention is intended to included all variations described herein, whether in the specification or in the drawing, including the broad meaning and range properly afforded to the language and description set forth herein to describe such variations.

It will thus be seen that the objects set forth above, including those made apparent from the preceding description, are efficiently attained. Since certain changes may be made in carrying out the construction of a method for metals processing according to the teachings herein, it is to be understood that my invention may be embodied in other specific forms without departing from the spirit or essential characteristics thereof. Many other embodiments are also feasible to attain advantageous results utilizing the principles disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

All of the features disclosed in this specification (including any accompanying claims, the drawing, and the abstract) may be combined in any combination, except combinations where at least some of the features are mutually exclusive. Each feature disclosed in this specification (including any accompanying claims, the drawing, and the abstract), may be replaced by alternative features serving the same or similar purpose, unless expressly stated otherwise. Thus, unless expressly stated otherwise, each feature disclosed is one example only of a generic series of equivalent or similar features. Further, while certain materials are described for the purpose of enabling the reader to make and use certain embodiments shown, such suggestions shall not serve in any way to limit the claims to the materials disclosed, and it is to be understood that other materials, including other metals and various compositions, may be utilized in the practice of my methods, and in the manufacture of my novel structures.

The intention is to cover all modifications, equivalents, and alternatives falling within the scope and spirit of the invention, as expressed herein above and in the appended claims. As such, the claims are intended to cover the structures, apparatus, and methods described herein, and not only the equivalents or structural equivalents thereof, but also equivalent structures or methods. The scope of the invention, as described herein and as indicated by the appended claims, is thus intended to include variations from the embodiments provided which are nevertheless described by the broad meaning and range properly afforded to the language of the claims, as explained by and in light of the terms included herein, or the equivalents thereof.

What is claimed is:

1. Tooling for working a structure to improve the fatigue strength at a selected location in said structure, said structure comprising a first surface, a second surface, and a body therebetween, said body suitable for forming therein an aperture having at least one sidewall extending between said first surface and said second surface, said tooling comprising:

a first indenter, said first indenter comprising a contacting end for engagement with and deformation of said first surface of said structure to impart a residual stress profile in said body of said structure, and wherein said contacting end of said first indenter comprises a surface shape substantially conforming to the shape which would be created by inducing a dimple in said first surface of said structure by application of a substantially uniform pressure profile on said first surface of said structure throughout a contact area between said contacting end and said first surface.

2. Tooling as set forth in claim 1, further comprising a second indenter, said second indenter comprising a contacting end for engagement with and deformation of said second surface of said structure to impart a residual stress profile in said body of said structure, and wherein said contacting end of said second indenter comprises a surface shape substantially conforming to the shape which would be created by inducing a dimple in said second surface of said structure by application of a substantially uniform pressure profile on said second surface of said structure throughout a contact surface between said contacting end and said second surface.

3. The tooling as set forth in claim 1, wherein said first indenter comprises a workpiece contacting surface with a preselected shaped profile, so that said residual stress profile along said at least one sidewall of said aperture in said structure is substantially uniform.

4. Tooling as set forth in claim 1, wherein said first indenter is hollow.

5. Tooling as set forth in claim 1, wherein said first indenter is solid.

6. Tooling as set forth in claim 1, wherein said contacting end is smoothly curved.

7. Tooling as set forth in claim 1, wherein said contacting end comprises at least one beveled edge.

8. Tooling as set forth in claim 7, wherein said contacting end of said indenter comprises at least two beveled edges.

9. Tooling as set forth in claim 1 or claim 2, further comprising at least one consumable workpiece, said consumable workpiece sized and shaped for insertion between said indenter and said first workpiece.

10. Tooling as set forth in claim 2, wherein said first indenter and said second indenter are of unequal cross-section.

11. A method for working a structure to improve the fatigue strength at a selected location in said structure, said structure comprising a first surface, a second surface, and a body therebetween, said body suitable for forming therein an aperture having at least one sidewall extending between said first surface and said second surface, said method comprising:

provilding a first indenter, said first indenter comprising a contacting end for engagement with and deformation of said first surface of said structure to impart a residual stress profile in said body of said structure, and wherein said contacting end of said first indenter comprises a surface shape substantially conforming to the shape which would be created by inducing a dimple in said first surface of said structure by application of a substantially uniform pressure profile on said first surface of said structure throughout a contact area between said contacting end and said first surface, engaging said first indenter with said workpiece with sufficient force to impart a stress wave in said workpiece, so as to cause formation of a dimple in said workpiece, disengaging said first indenter from said workpiece, machining said workpiece to form an aperture of pre-selected size and shape, so as to provide substantially uniform residual stress along the side walls of said aperture, so as to improve fatigue life of said workpiece.

12. The method as set forth in claim 11, further comprising:

providing a second indenter, said second indenter comprising a contacting end for engagement with and deformation of said second surface of said structure to impart a residual stress profile in said body of said structure, and wherein said contacting end of said second indenter comprises a surface shape substantially conforming to the shape which would be created by inducing a dimple in said second surface of said structure by application of a uniform pressure profile on said second surface of said structure throughout a contact surface between said contacting end and said second surface engaging said second indenter with said workpiece to cause formation of a dimple in said workpiece;

disengaging said second indenter from said workpiece.

13. The method as set forth in claim 11, wherein said first indenter comprises a shaped profile, so that said residual stress profile along said at least one sidewall of said aperture in said structure is substantially uniform.

14. The method as set forth in claim 11, wherein said first indenter is hollow.

15. The method as set forth in claim 11, wherein said first indenter is solid.

16. The method as set forth in claim 11 or in claim 12, wherein said first indenter contacting end is smoothly curved.

17. The method as set forth in claim 11, wherein said contacting end comprises at least one beveled edge.

18. The method as set forth in claim 11, wherein said contacting end of said indenter comprises at least two beveled edges.

19. The method as set forth in claim 11 or in claim 12, further comprising at least one consumable workpiece, said consumable workpiece sized and shaped for insertion between said indenter and said first workpiece.

20. The method as set forth in claim 12, wherein said first indenter and said second indenter are of unequal cross-section.

21. Tooling for working a structure to improve the fatigue strength at a selected location in said structure, said structure comprising a first surface, a second surface, and a body therebetween, said tooling comprising:

a first indenter, said first indenter comprising a contacting end for engagement with and deformation of a pre-selected portion of said first surface of said structure to impart a residual stress profile in said body of said structure, and wherein said contacting end of said first indenter comprises a shaped surface profile substantially conforming to a dimple shape in said first surface of said structure produced by the application of a substantially uniform pressure profile on said pre-selected portion of said first surface of said structure.

22. Tooling as set forth in claim 21, wherein said first indenter comprises a dynamic indenter, said dynamic indenter adapted for engagement of said shaped surface of said contacting end against said first surface of said structure, to produce stress waves in said structure.

23. Tooling as set forth in claim 21, further comprising a backing anvil, said backing anvil adapted to firmly support said structure when said structure is subjected to engagement by said indenter, so that movement of said structure is substantially prevented in a direction normal to the direction of action on said structure by said dynamic indenter.

24. Tooling as set forth in claim 21, further comprising a second indenter, said second indenter comprising a contacting end for engagement with and deformation of a pre-selected portion of said second surface of said structure to impart a residual stress profile in said body of said structure, and wherein said contacting end of said second indenter comprises a surface shape substantially conforming to a dimple shape in said second surface of said structure produced by the application of a substantially uniform pressure profile on said pre-selected portion of said second surface of said structure.

25. Tooling as set forth in claim 24, wherein said second indenter comprises a second dynamic indenter, said second dynamic indenter adapted for engagement of said shaped surface of said contacting end against said second surface of said structure, to produce a stress wave in said structure.

26. Tooling as set forth in claim 24, wherein said first indenter and said second indenter are of unequal cross-sectional area.

27. Tooling as set forth in claim 22, wherein said first indenter leaves a footprint shape in response to engagement of said contacting end against said structure, and wherein said footprint shape is substantially circular.

28. Tooling as set forth in claim 22, wherein said first indenter leaves a footprint shape in response to engagement of said contacting end against said structure, and wherein said footprint shape is non-circular.

29. Tooling as set forth in claim 25, wherein said second indenter leaves a footprint shape in response to engagement of said contacting end against said structure, and wherein said footprint shape is substantially circular.

30. Tooling as set forth in claim 25, wherein said second indenter leaves a footprint shape in response to engagement of said contacting end against said structure, and wherein said footprint shape is non-circular.

31. Tooling as set forth in claim 25, wherein said footprint of said second indenter and said footprint of said first indenter are of unequal cross-sectional area.

32. Tooling as set forth in claim 21, wherein said first indenter is hollow.

33. Tooling as set forth in claim 21, wherein said first indenter is solid.

34. Tooling as set forth in claim 24, wherein said second indenter is hollow.

35. Tooling as set forth in claim 25, wherein said second indenter is solid.

36. Tooling as set forth in claim 21, wherein said contacting end of said first indenter comprises a smoothly curved surface portion.

37. Tooling as set forth in claim 24, wherein said contacting edge of said second indenter comprises a smoothly curved surface portion.

38. Tooling as set forth in claim 21, wherein said contacting end of said first indenter comprises at least one beveled edge.

39. Tooling as set forth in claim 25, wherein said contacting end of said second indenter comprises at least one beveled edge.

40. Tooling as set forth in claim 38, wherein said contacting end of said first indenter comprises at least two beveled edges.

41. Tooling as set forth in claim 39, wherein said contacting end of said second indenter comprises at least two beveled edges.

42. Tooling as set forth in claim 21 or claim 22, further comprising at least one deformable, consumable lamina, said deformable, consumable lamina sized and shaped for insertion between said indenter and said first work-piece, before engagement of said indenter with said workpiece.

43. Tooling as set forth in claim 42, wherein a first deformable, consumable lamina is provided between said first indenter and said workpiece, and wherein a second deformable, consumable lamina is provided between said second indenter and said workpiece.

44. Tooling as set forth in claim 42, wherein said first indenter comprises a dynamic indenter, said dynamic indenter adapted for engagement of said shaped surface of said contacting end against said deformable consumable lamina, to produce stress waves in said deformable consumable lamina.

45. A method for working a bounding portion of material in a structure, said bounding portion adjacent a pre-selected location for an opening in said structure, in order to provide residual compressive stresses in said bounding portion for improving the fatigue life of said structure, said method comprising:

providing an indenter, said indenter comprising a surface portion, said surface portion adapted to impact said structure at pre-selected surface locations adjacent said pre-selected location for said opening in said structure;

indenting said pre-selected surface location of said structure to provide a pre-selected amount of residual stress in said structure toward said bounding portion of material; and wherein said contacting surface portion of said indenter comprises a shaped surface profile substantially conforming to a dimple shape in said structure produced by the application of a substantially uniform pressure profile at or near said pre-selected surface location of said structure.

46. The method as set forth in claim 45, further comprising removal of a selected portion of material from said structure, said selected portion of material removed from said structure having an outer border portion, said outer border portion located at or adjacent to said pre-selected surface location on said structure having been impacted by said shaped surface portion of said indenter, so that said bounding portion of material expands transversely to said outer border portion of said selected portion of material removed from said structure.

47. The method as set forth in claim 45, wherein said indenter comprises a dynamic indenter.

48. The method as set forth in claim 45, wherein said opening comprises and elongated recessed portion.

49. The method as set forth in claim 48, wherein said opening comprises a through passageway.

50. The method as set forth in claim 48, wherein said elongated recessed portion further comprises a closed end portion.

51. The method as set forth in claim 45, wherein said indenter comprises a shaped indenter surface portion, said shaped indenter surface portion providing, when impacted on said workpiece at a preselected velocity, a pre-selected amount of permanent deformation in said workpiece sufficient to produce a shaped surface portion in said workpiece corresponding to that shape formed by indenting said pre-selected location in such workpiece material with a uniform pressure profile, and wherein said uniform pressure profile over said pre-selected location is at least as large as the yield stress pressure in said material.

52. The method as set forth in claim 45, wherein said surface portion comprises a flat surface portion.

* * * * *